Oct. 20, 1925.

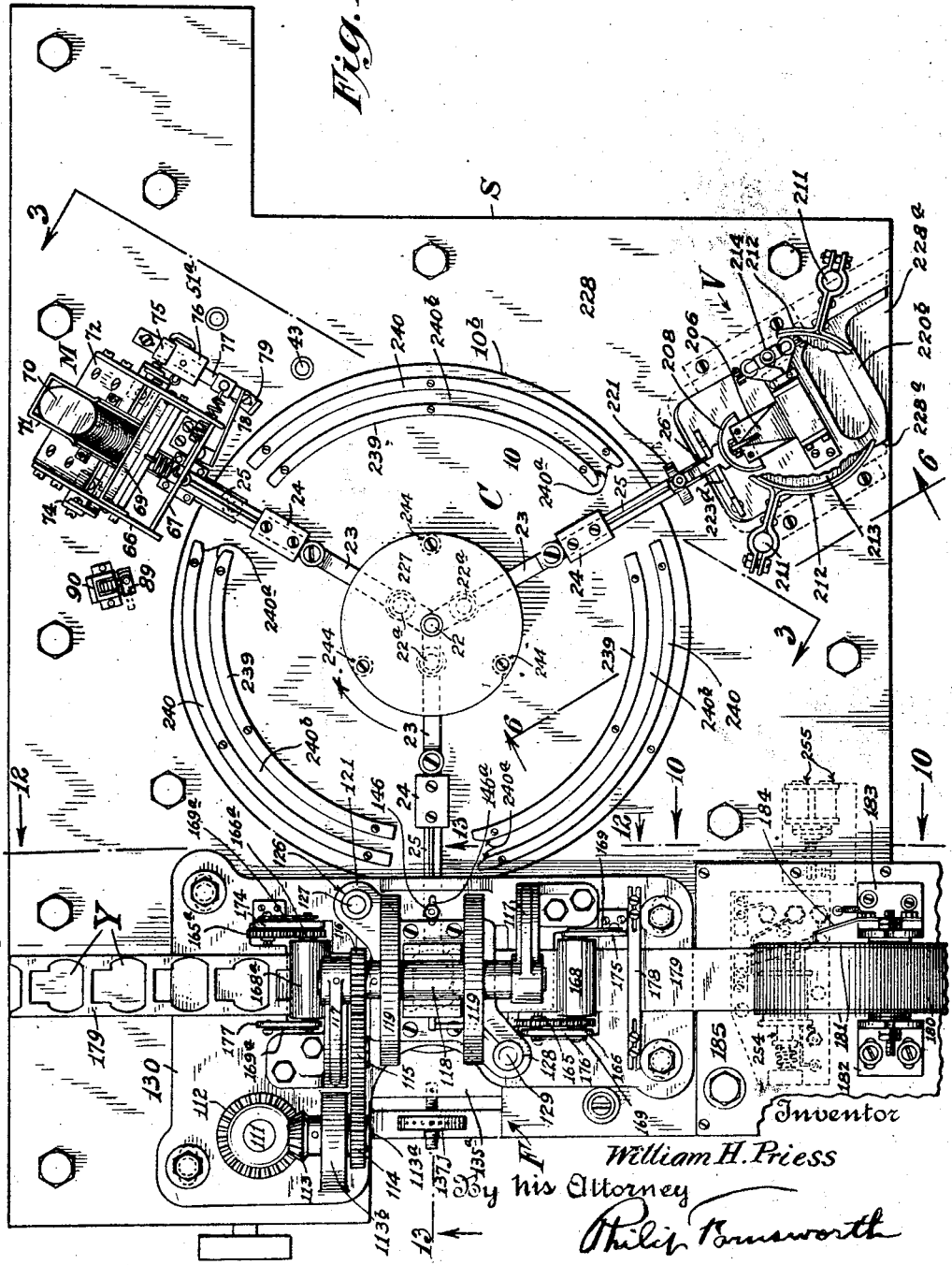

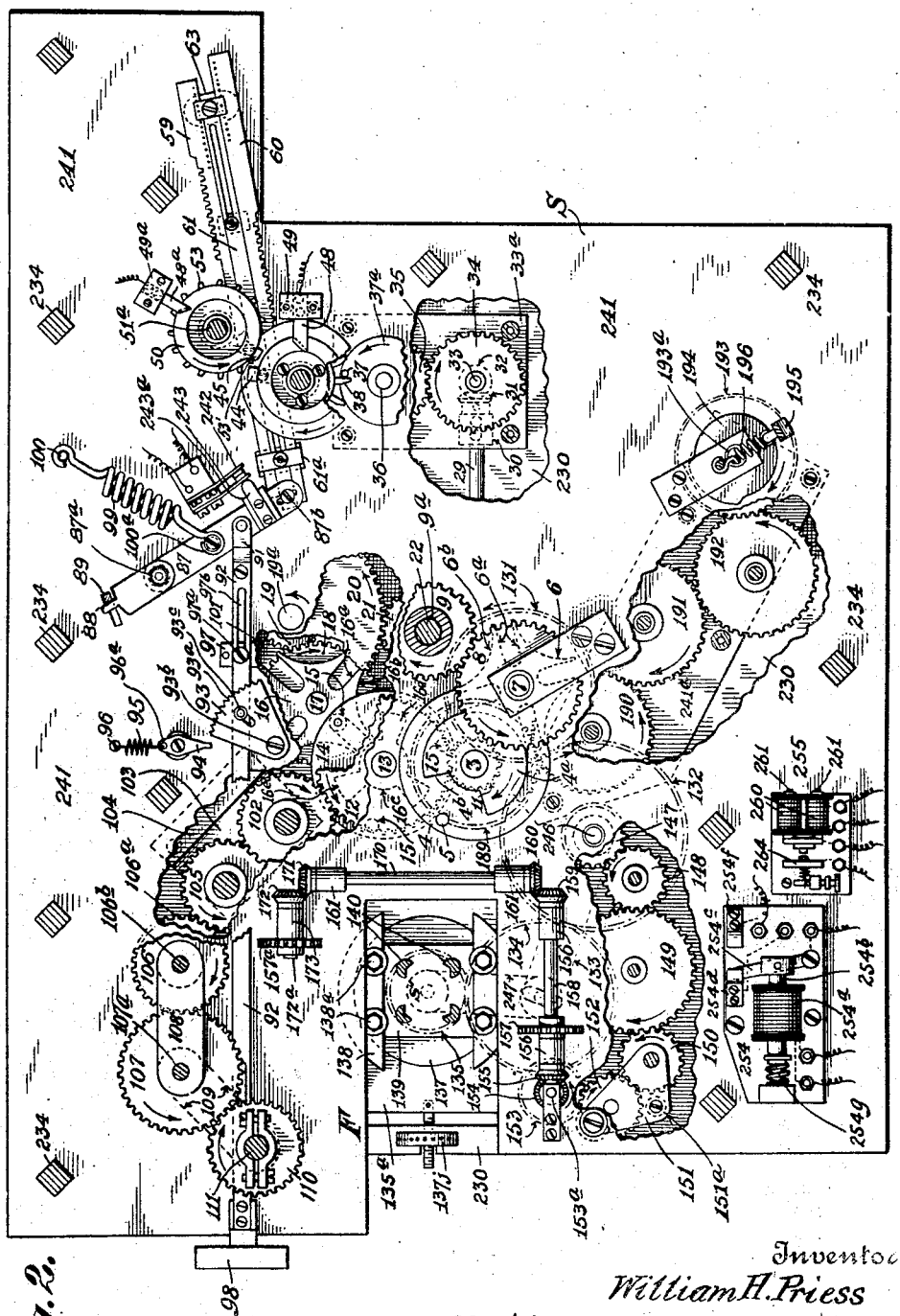

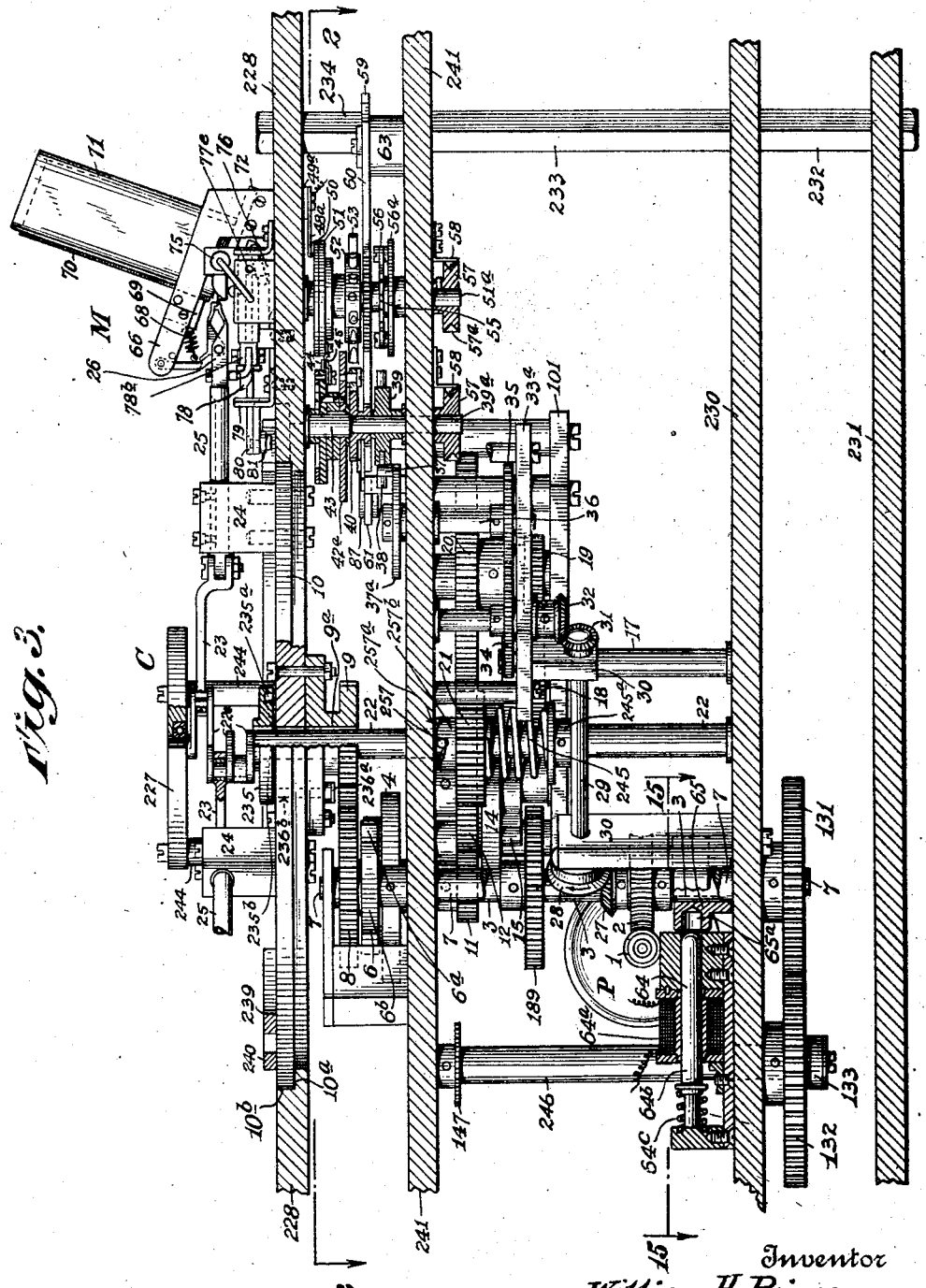

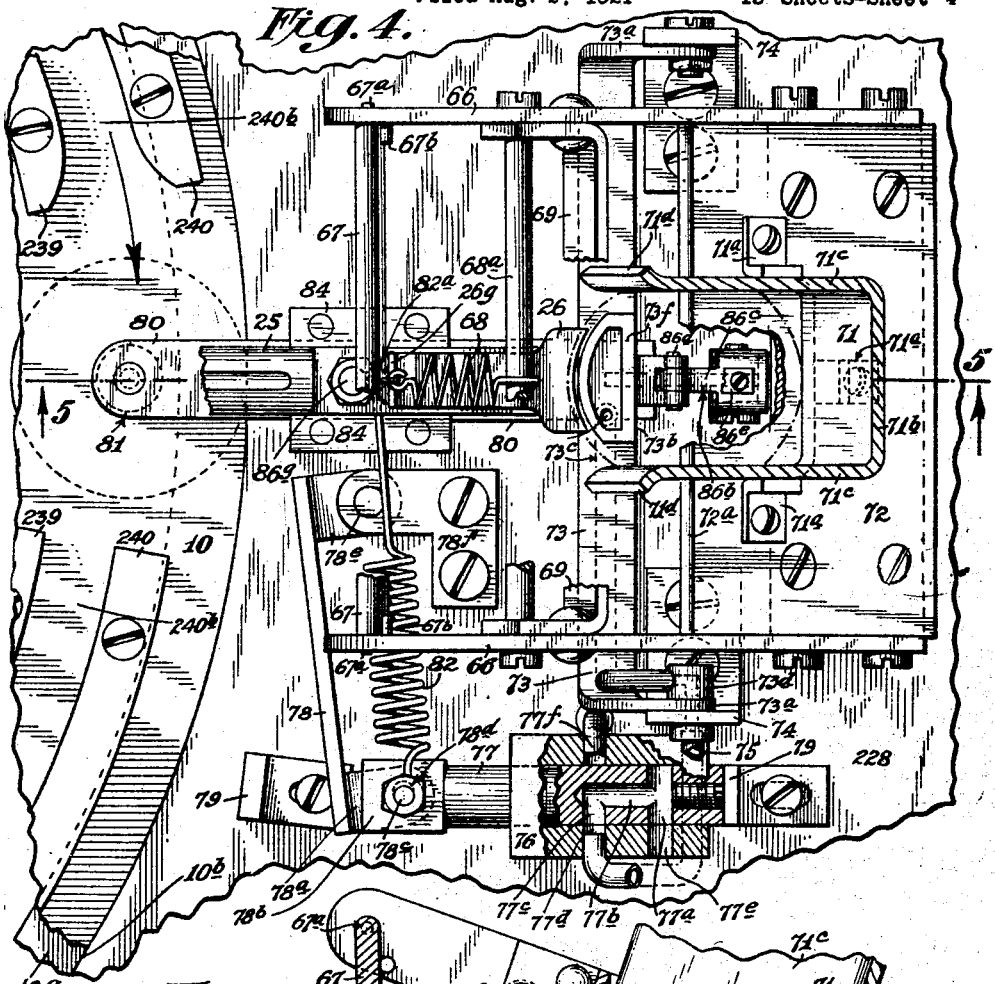

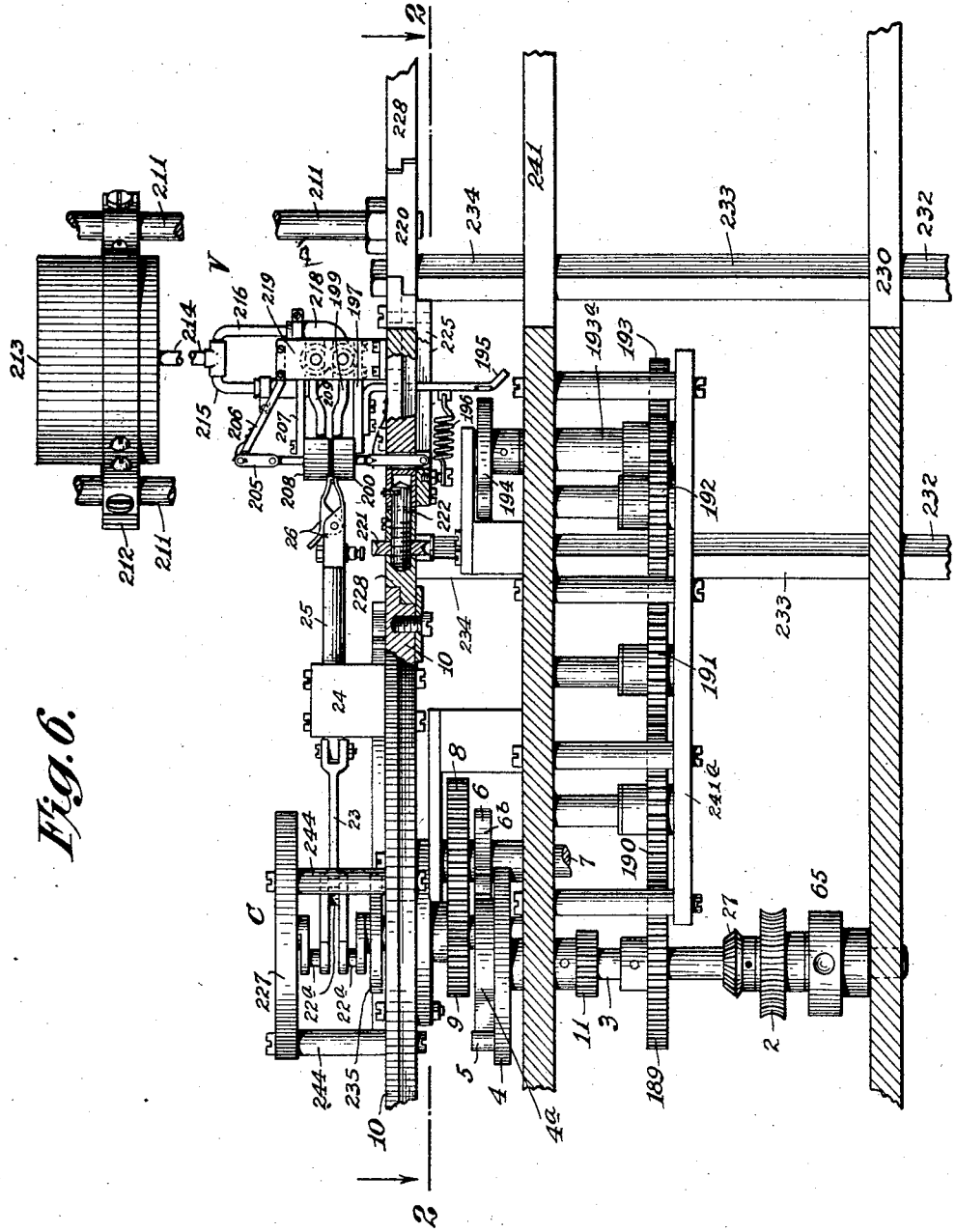

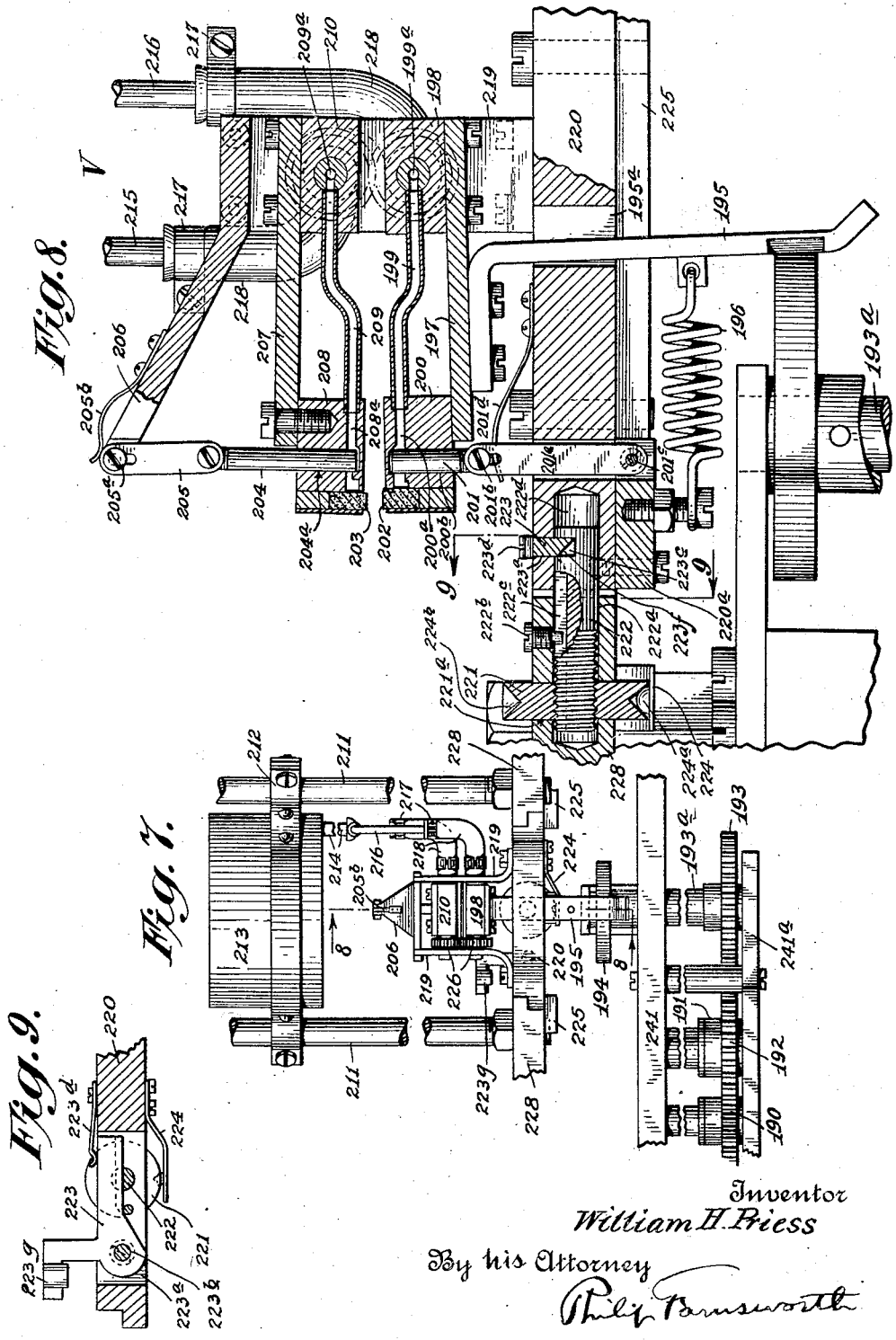

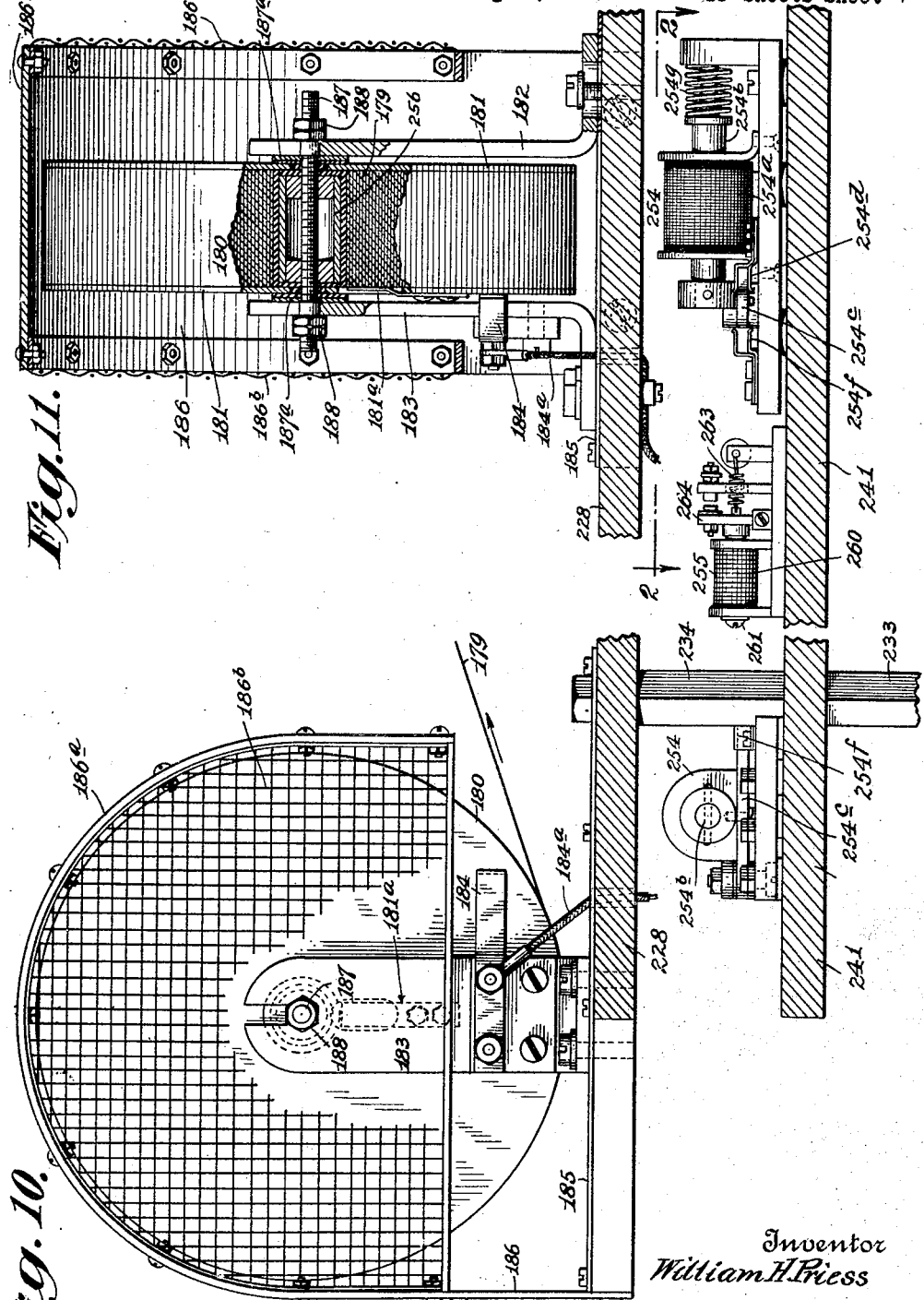

W. H. PRIESS 1,557,724

MACHINE AND METHOD FOR BUILDING ELECTRICAL CONDENSER STACKS

Filed Aug. 2, 1921 13 Sheets-Sheet 8

Inventor
William H. Priess
By his Attorney

Oct. 20, 1925.
W. H. PRIESS
1,557,724
MACHINE AND METHOD FOR BUILDING ELECTRICAL CONDENSER STACKS
Filed Aug. 2, 1921 13 Sheets-Sheet 9
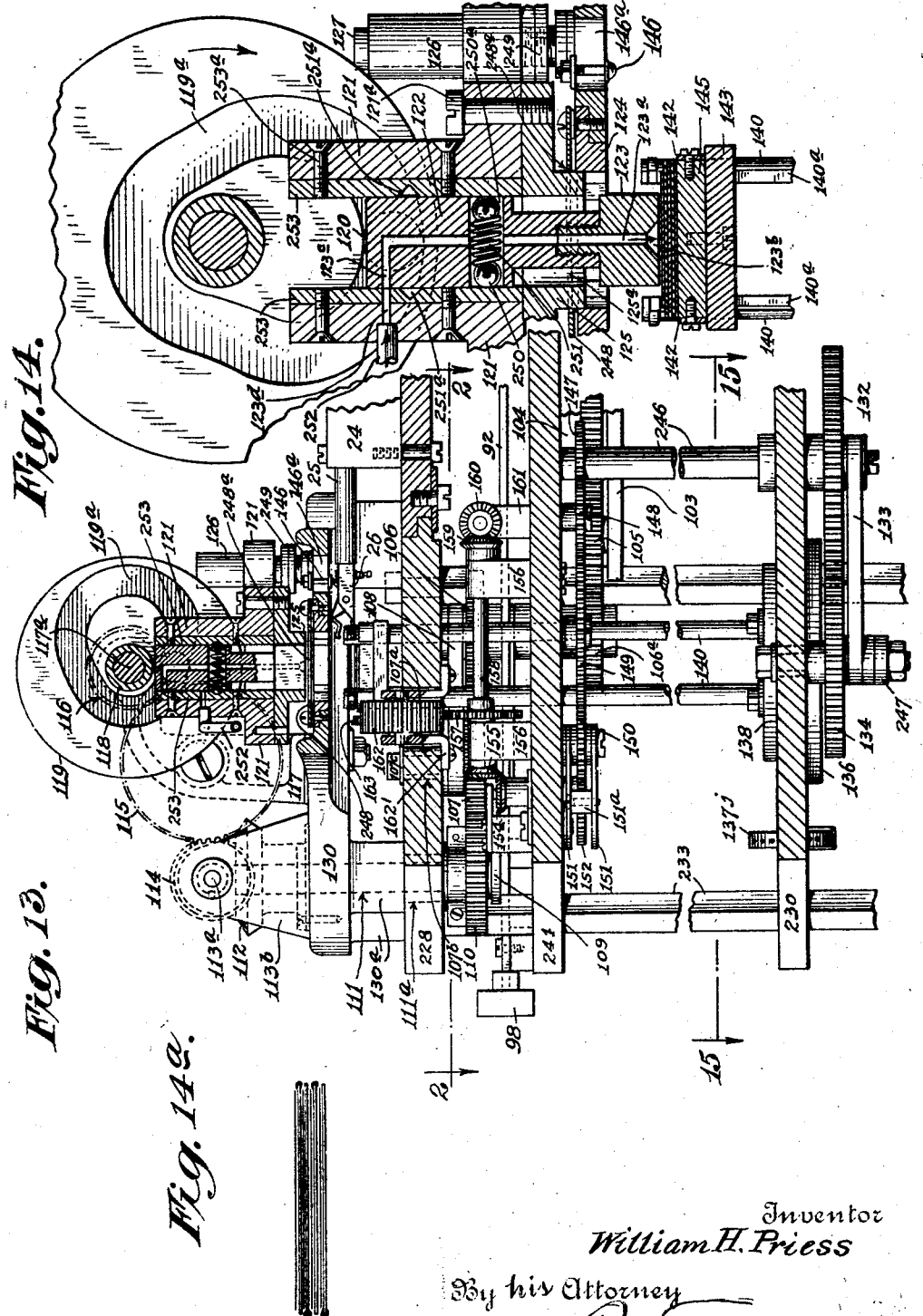
Inventor
William H. Priess
By his Attorney
Philip Farnsworth Oct. 20, 1925. 1,557,724
W. H. PRIESS
MACHINE AND METHOD FOR BUILDING ELECTRICAL CONDENSER STACKS
Filed Aug. 2, 1921 13 Sheets-Sheet 10
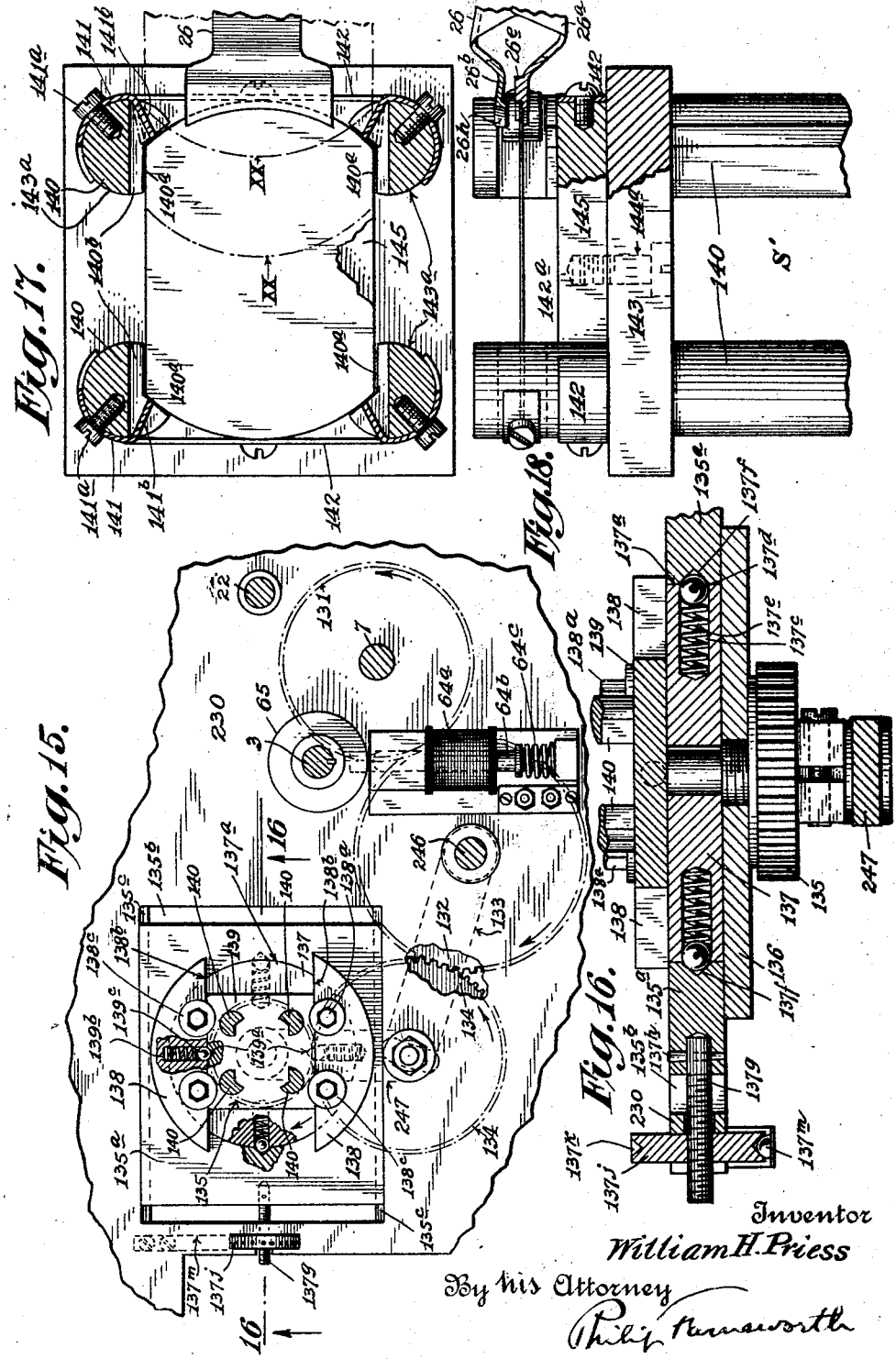

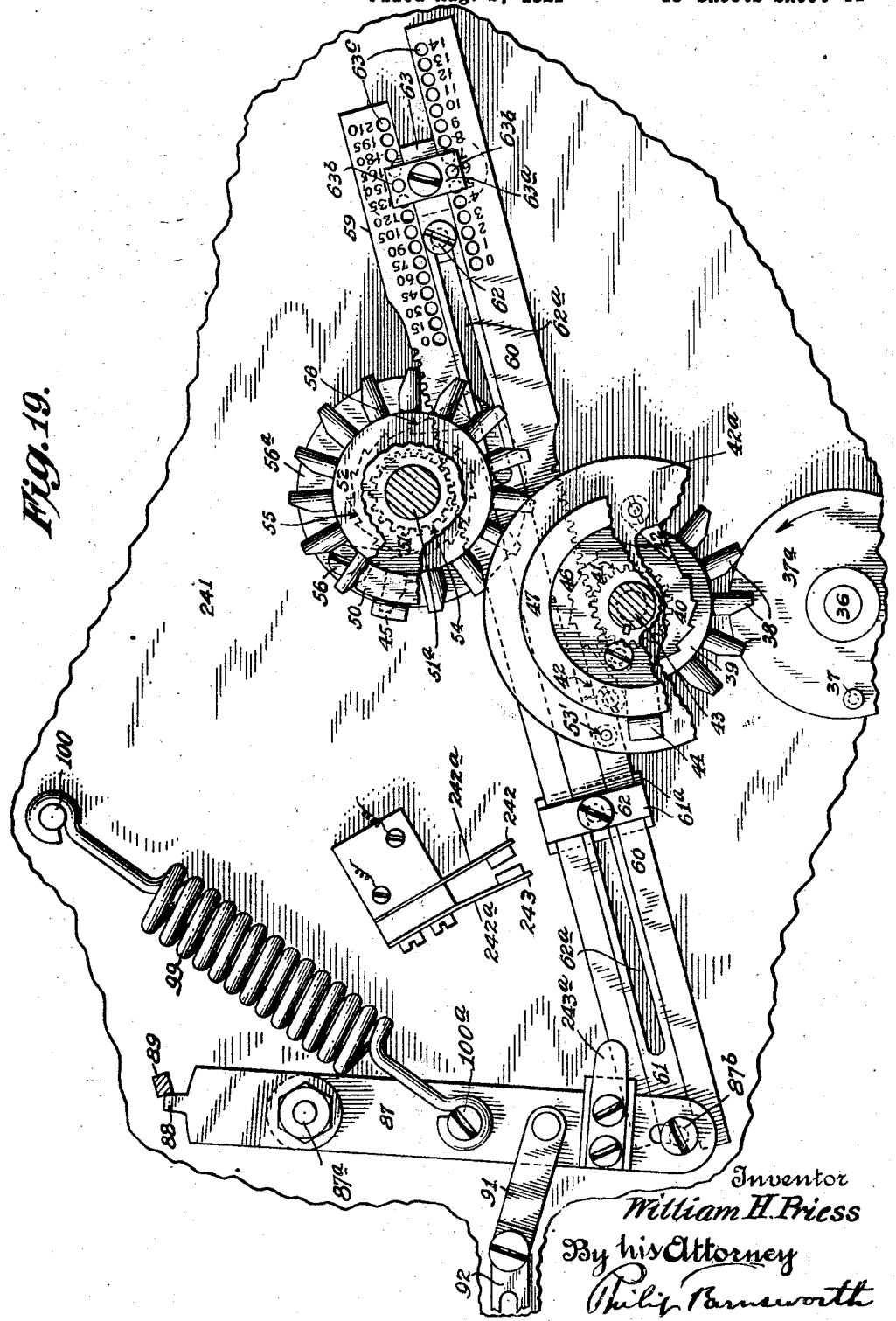

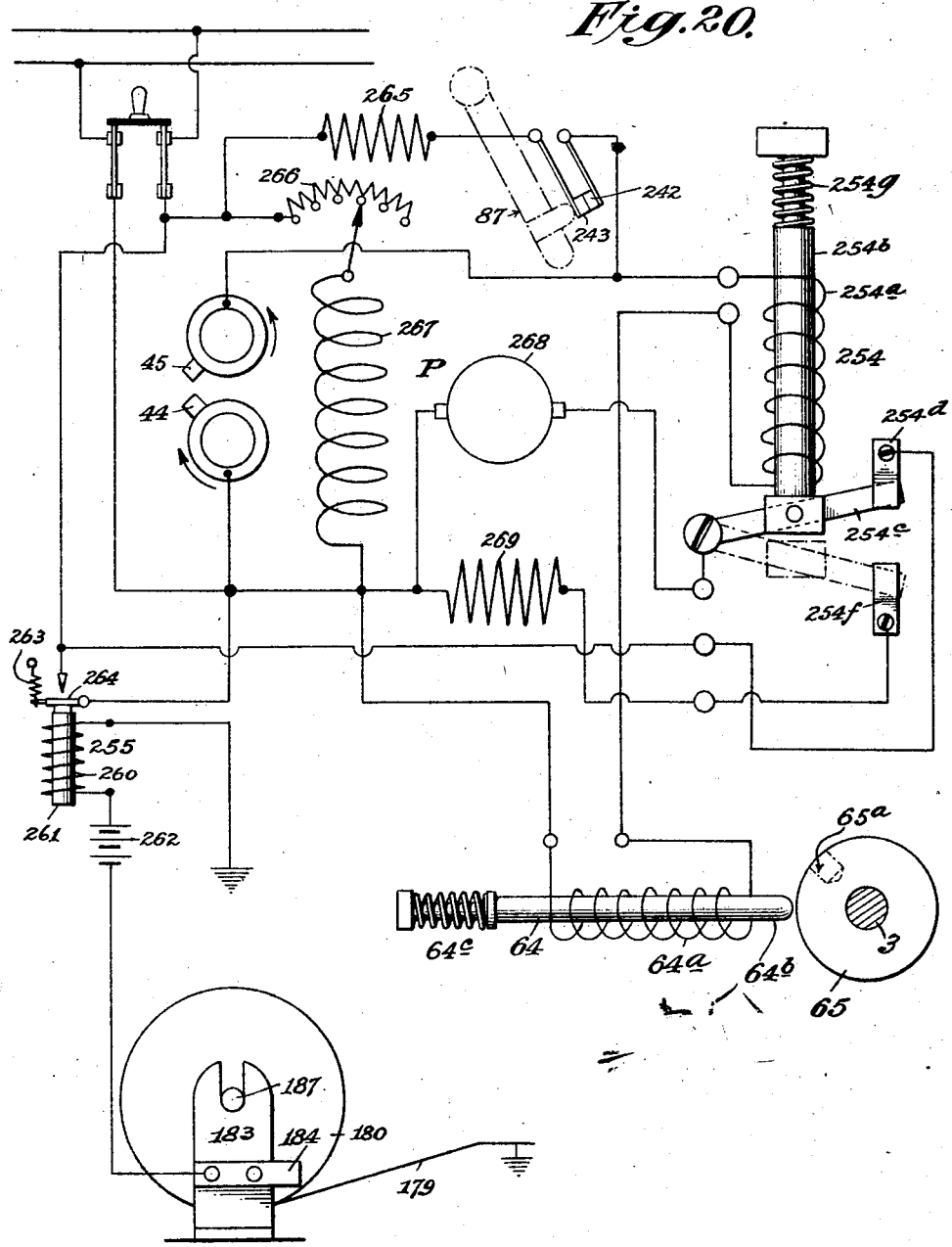

Oct. 20, 1925.
W. H. PRIESS
1,557,724
MACHINE AND METHOD FOR BUILDING ELECTRICAL CONDENSER STACKS
Filed Aug. 2, 1921  13 Sheets-Sheet 13
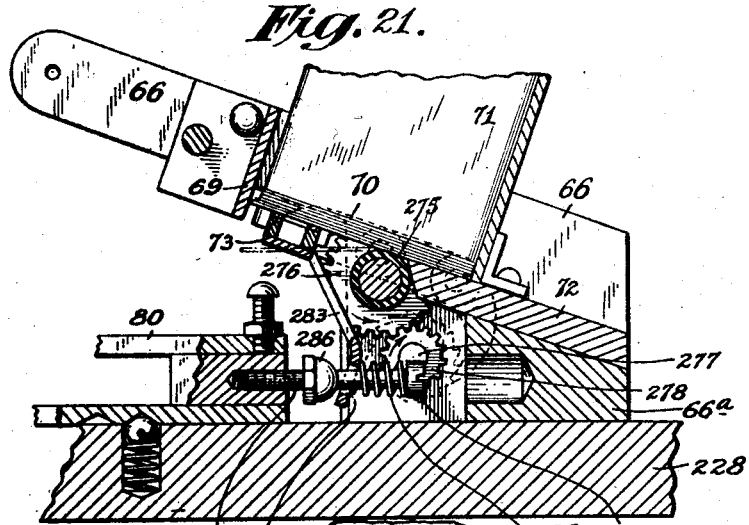
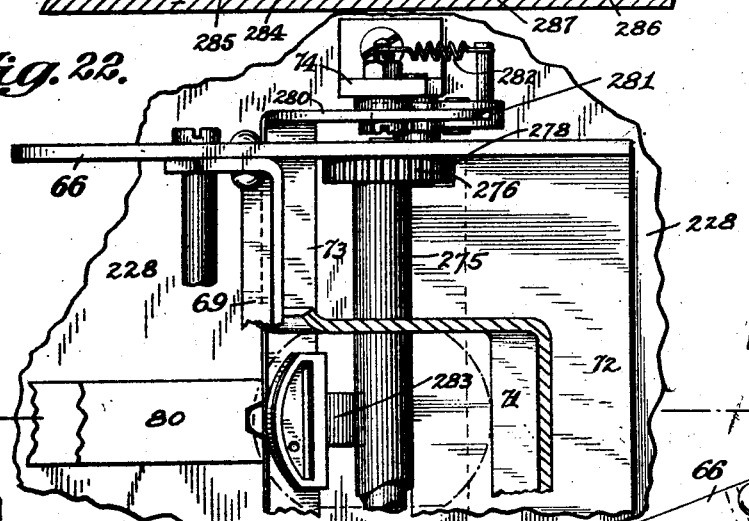
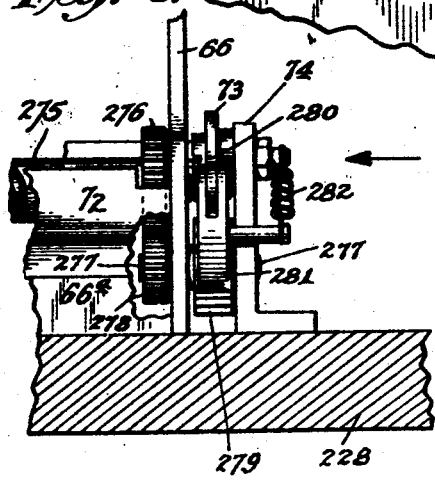
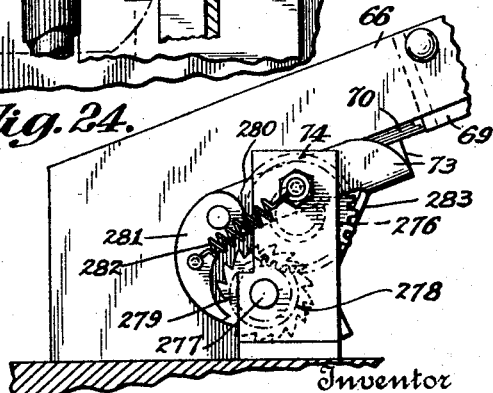
Inventor
William H. Priess
By his Attorney
Philo Farnsworth Patented Oct. 20, 1925.

1,557,724

UNITED STATES PATENT OFFICE.

WILLIAM H. PRIESS, OF BELMONT, MASSACHUSETTS, ASSIGNOR TO WIRELESS SPECIALTY APPARATUS COMPANY, OF BOSTON, MASSACHUSETTS, A CORPORATION OF NEW YORK.

MACHINE AND METHOD FOR BUILDING ELECTRICAL CONDENSER STACKS.

Application filed August 2, 1921. Serial No. 489,156.

*To all whom it may concern:*

Be it known that I, WILLIAM H. PRIESS, a citizen of the United States of America, and a resident of Belmont, State of Massachusetts, have invented certain new and useful Machines and Methods for Building Electrical Condenser Stacks, the principles of which are set forth in the following specification and accompanying drawings, which disclose the form of the invention which I now consider to be the best of the various forms in which the principles of the invention may be embodied.

This invention relates to machines and methods for building electrical condenser stacks.

The machine of the present invention, either taken as a whole or taking its several features separately, is of general application and may be used for building stacks comprising sheets of different kinds of material which are used for different purposes. In particular, however, the machine of the present invention is especially adapted for the manufacture of electrical condensers of the sheet type and especially of the type which utilizes mica as a dielectric.

Electrical condensers of the sheet type consist of alternate layers of foil and dielectric in which, in most cases, the foil is arranged to project beyond the mica alternately at opposite sides to provide terminals for connecting, and the condensers are provided with margins to prevent leakage between the foil on one side of the dielectric and the foil on the other side of the dielectric. Condensers are of general application. Some are of the transmitting or high potential type for use in radio transmission; others are used for protective purposes and in ignition systems. In most cases, the stack is treated, either during the building operation or after completion, with an insulating material such as paraffin or varnish. By way of exemple, condensers, such as used in transmitters of radio circuits, have been in the past built and constructed in the manner shown and described in the pending application of Pickard, S. N. 380,919, filed 12 May, 1920, and in a pending application of Priess, S. N. 456,903, filed 30 March, 1921. The process employed in the manufacture of condensers especially adapted for ignition work, known as magneto condensers, is disclosed and described in a pending application of Priess, S. N. 377,977, filed 30 April, 1920. The processes now in use in the manufacture of condensers are manual, and the accuracy of building the stack and of alining the foil and dielectric depends largely upon the skill of the operator. It has been found that manual processes result in a product having more or less lack of uniformity, inaccurately laid alternate conducting and mica sheets, and nonuniformity in varnishing the parts of the condensers. The manual process, moreover, is slow and comparatively expensive.

An object of the present invention is to provide a machine for doing the work which previously has been done by hand.

In the present embodiment of the invention, the machine comprises three operating positions with means for successively and continuously carrying the material acted upon, such as, the mica sheets, from and to these positions of operation. The general plan of the machine is as follows.

One of the operating positions comprises a hopper or magazine containing sheets of mica of the desired size and a pickup mechanism. At another position is located mechanism for varnishing or treating the mica with a suitable insulating material. At a third position is located the mechanism for alternately laying the mica and foil sheets. Mechanism is provided for removing the mica sheets from the hopper, transferring them to the varnishing apparatus, and then depositing them in a building stack where foil sheets are deposited upon them. The whole operation is continuous, and the same source of power or prime mover drives the several mechanisms. The transmission gears for the several mechanisms are so related that the mica will be carried around and treated or acted upon by the several mechanisms successively.

The several features of the machine above mentioned may be utilized in whole or in part in a practical embodiment of the condenser machine, and may also have general application to other uses. For example, the mica hopper and pickup device for the mica may be used for carrying mica from the hopper to a point of application where an entirely different process is applied to it, such as dieing or cutting the mica. In some cases, the varnishing mechanism may be omitted or the varnishing may be applied at some other point in the process or operation of the machine. Or the stack building and foil applying mechanism may be used alone, the operator simply placing either varnished or unvarnished sheets of mica in position and causing the foil-depositing mechanism to operate.

Means are provided for depositing the foil sheets so that they will project alternately from opposite sides of the mica to form the terminals above mentioned. In the present embodiment of the invention, between each operation of the foil dieing and depositing mechanism, the stand on which the stack is being built is rotated 180°, as more fully described hereinafter. The varnishing or wax applying might also be done in ways other than that described herein.

The machine of the present invention, in so far as it relates to the mica pickup device, utilizes the natural qualities of the mica whereby it may be flexed or bent to remove it from the bottom of the magazine stack. Furthermore, during the varnishing operation, as each sheet of mica is pulled out from between varnishing jaws, a bead of varnish is formed upon one edge of the mica at the end which is pulled out last, and this bead is utilized for distributing the varnish uniformly throughout the stack, since 180° motion of the stack building stand between the successive laying of mica films causes the beads to be placed alternately. Since the portion of mica covered by the mica-removing jaws is not varnished, the bead of varnish on the edge of the adjacent film of mica covers this unvarnished portion, the films being alternately placed. The result is to produce very even distribution of varnish throughout the stack, and on baking under spring pressure provides a condenser whose margin will be filled with baked varnish.

In the accompanying drawings, Figure 1 is a top plan view of the complete machine.

Fig. 2 is a horizontal section of the complete machine on the line 2—2 of Figs. 3, 6, 11, 12 and 13 looking in the direction of the arrows.

Fig. 3 is a detailed vertical section on the line 3—3 of Fig. 1 looking in the direction of the arrows, Fig. 3 being on somewhat larger scale than that of Fig. 1.

Fig. 4 is a fragmentary plan view, partly in section, of the mica magazine device on an enlarged scale.

Fig. 5 is a vertical section of the same on the line 5—5 of Fig. 4 looking in the direction of the arrows, the parts being in the position they assume when a sheet of mica is about to be withdrawn from the magazine.

Fig. 6 is a detail vertical section on a somewhat larger scale, on the line 6—6 of Fig. 1 looking in the direction of the arrows, illustrating a detail of the varnish mechanism.

Fig. 7 is an end elevation of the varnishing apparatus as viewed from the right of Fig. 6.

Fig. 8 is a detail section on an enlarged scale on the line 8—8 of Fig. 7, looking in the direction of the arrows.

Fig. 9 is a vertical detail section of a locking detent on an enlarged scale and on line 9—9 of Fig. 8 looking in the direction of the arrows.

Fig. 10 is an enlarged vertical detail section of a part of the foil feeding mechanism on the line 10—10 of Fig. 1 looking in the direction of the arrows.

Fig. 11 is an end elevation, partly in section, of the drum of Fig. 10 as viewed from the right of Fig. 10.

Fig. 13 is a vertical detail section of the stack-building and foil-depositing mechanism transversely of Fig. 12 and on the line 13—13 of Fig. 1, looking in the direction of the arrows.

Fig. 14 is an enlarged detail of a fragment of Fig. 13 with the moving parts in the alternate position.

Figure 12:
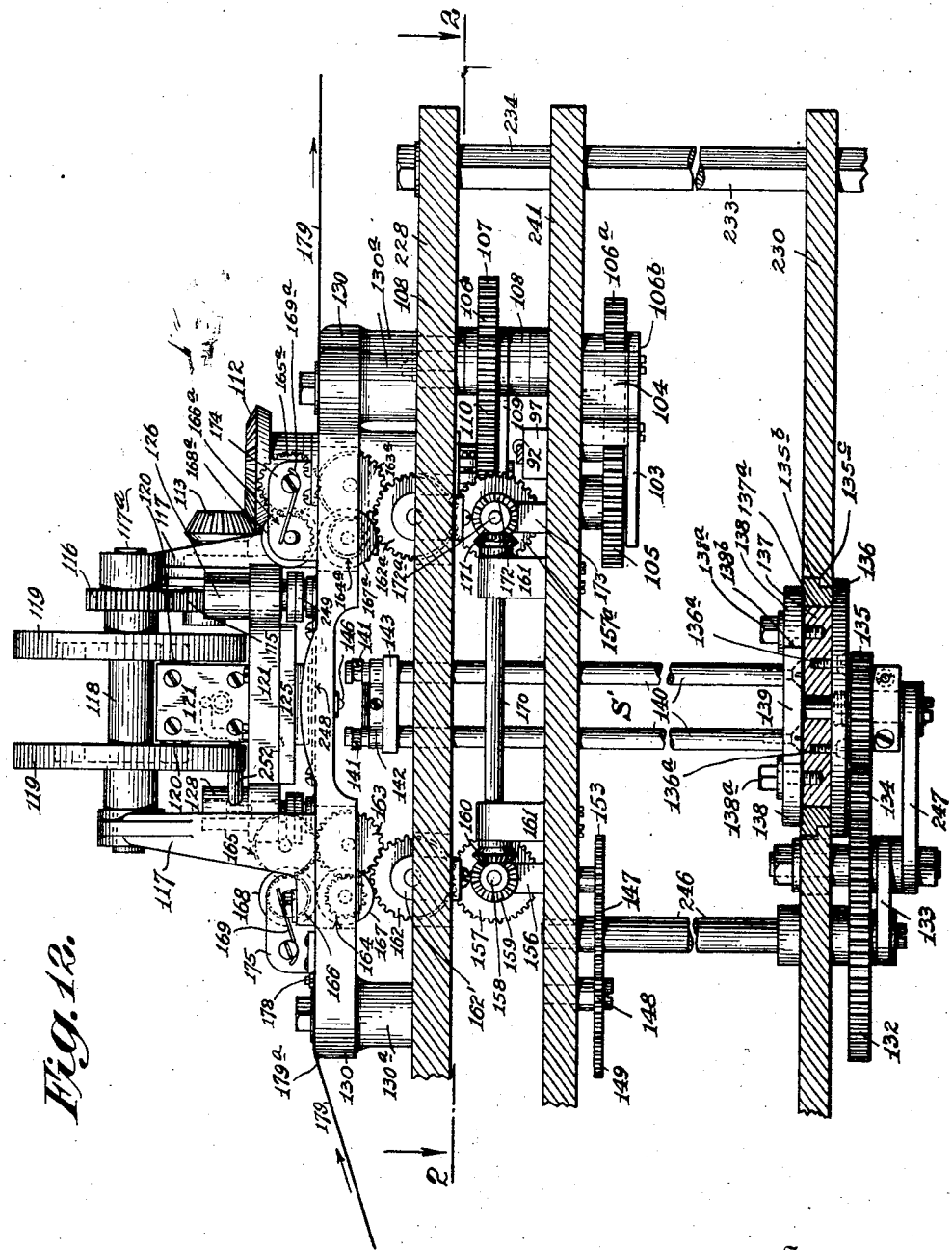
Fig. 12 is an enlarged vertical detail section of the stack-building and foil-laying mechanism on the line 12—12 of Fig. 1 looking in the direction of the arrows.

Fig. 14ª is a diagrammatical view of a portion of a stack as built by the machine of the present invention.

Fig. 15 is a horizontal fragmentary section on the line 15—15 of Fig. 13, looking in the direction of the arrows, showing the rotatable stack building stand on an enlarged scale.

Fig. 16 is a vertical section of a part of Fig. 15 on the line 16—16 of Fig. 15, looking in the direction of the arrows.

Fig. 17 is a horizontal plan section of the stack building stand illustrating the method in which the mica is placed in position therein.

Fig. 18 is a side elevation partly in section of the stack building stand illustrating with Fig. 17 how the mica is inserted in the stand.

Fig. 19 is an enlarged detail plan view of the counting mechanism shown in Fig. 2, but with the parts in the alternate position.

Fig. 20 is a diagrammatic view of the electric controlling circuit used on the machine.

Fig. 21 is a supplemental mica alining device, associated with the mica hopper, the view being a vertical section on the line 21—21 in Fig. 22.

Fig. 22 is a top plan view of the construction shown in Fig. 21.

Fig. 23 is a rear elevation of the upper end of the construction shown in Fig. 22.

Fig. 24 is an end elevation of the construction shown in Fig. 23, looking from the right.

Referring to Fig. 1, the mica magazine or hopper with its controlling or pickup mechanism is indicated generally at M, the varnishing mechanism is indicated generally at V, while the foil dieing and foil-laying mechanism is indicated at F. The mica-carrying mechanism is indicated generally at C. The three mechanisms M, V and F are arranged 120° apart around a rotatable table 10 a part of the carrying mechanism C. The several mechanisms above briefly referred to are actuated by a worm 1 driven from a suitable source of power or by motor P, and meshing with a worm wheel 2 on a main shaft 3. (See Figs. 2, 3 and 6.) The motor and transmission mechanism, as well as the several mechanisms M, V, F and C, are mounted on a suitable framework or support S, which framework comprises a series of tables 231, 230, 241, 228, superimposed above each other in spaced-apart relationship and connected by vertical rods 232, 233 and 234.

*Mica carrying mechanism C.*

The main shaft 3 has secured to it above the table or support 241 (Figs. 2, 3 and 6) a pinwheel 4 having thereon a pin 5 for driving the hereinafter-described mica-transferring mechanism C. A star wheel 6 is secured to a vertical shaft 7 journaled in tables 230 and 241 (Figs. 2, 3 and 6). The star wheel 6 comprises four radially-arranged slots 6ª extending inwardly from the perifery and arranged 90° apart and with intermediate concave cam surfaces 6ᵇ adapted to co-operate with a locking cam 4ª secured to shaft 3 in the horizontal plane of the star wheel 6 (see Fig. 2). The cam 4ª is segmental, being cut away as indicated at 4ᵇ at a point facing the pin 5. With the pin 5 and segment 4ª in the positions shown in Fig. 2, the segment 4ª, which has a convex edge, is engaging one of the surfaces 6ᵇ of the star wheel 6, preventing the rotation of the latter. As the rotation of the pinwheel 4 and segment 4ª continues, the segment will finally disengage the star wheel 6, and the pin 5 will enter one of the slots 6ª of the star wheel as shown at 15, illustrating another star wheel operating on a similar principle. The gearing above described, including the pin wheel 4 and star wheel 6, constitutes what is known as a Geneva gear transmission for imparting an intermittent rotatary motion to the mica-carrying mechanism C, and in this instance the rotatable table 10 and the mica pickup arms 25, as more fully hereinafter described. For this purpose, secured to the shaft 7 above the star wheel 6 is a gear 8 which meshes with a gear 9 secured, as shown in Fig. 3, to the rotatable table 10 having a bearing as indicated at 10ª on the top table support 228, which, for the purpose of receiving the table 10, is provided with a central circular opening 10ᵇ.

By way of example, if the pinwheel 4 has 60 R. P. M., the star wheel and its shaft will rotate 90° in a quarter of a second, imparting to the table 10 through gears 8 and 9 a revolution of 120° in a quarter of a second, the table having a rest in each second of ¾ of a second.

The gear 9 (Fig. 3) is provided with a vertical opening 9ª sufficiently large to allow the shaft 22 hereinafter described to pass through. For moving the hereinafter described arms 25 radially with reference to the table 10, a gear 11 is secured to the main shaft 3 and meshes with the gear 12 (see Figs. 2 and 3) secured to shaft 13 mounted vertically upon the supports. To shaft 13 is also secured a pinwheel 14 having thereon three downwardly projecting pins 15 arranged 120° apart around the circumference of the wheel 14 (Figs. 2 and 3). The shaft 13 with the gear 12 and pinwheel 14 is located between the tables 230 and 241 as shown in Fig. 3, the shaft 13 being journaled in table 241 and in a gear supporting plate 101 suspended from table 241. A star wheel 16 is secured to the upper end of a vertical shaft 17 journaled above the support 230 and in plate 101. Star wheel 16 comprises four radial slots 16ª arranged 90° apart and extending inwardly from the perifery and with segmental concavities 16ᵇ between each adjacent pair of slots 16ª. Secured to shaft 13 in the plane of the starwheel 16 is a segmental locking cam 16ᶜ having three radially extending arms 16ᵈ spaced 120° apart but extending midway between the pins 15 (Fig. 2). These arms 16ᵈ of the member 16ᶜ are provided with curved edges 16ᵉ at their outer ends, adapted to periodically and successively engage the concavities 16ᵇ of the star wheel 16 and lock the same against rotation. In the position shown in Fig. 2, it will be noted that one of the pins 15 is in engagement with the star wheel 16 in one of the slots 16ª, which causes an intermittent motion of the star wheel 16. When a pin 15 leaves the star wheel 16, one of the arms 16ᵈ of the member 16ᶜ will engage a concavity 16ᵇ, locking the star wheel against further movement. The mechanism here described is a Geneva gear transmission for imparting intermittent motion to the mechanism, including the arms 25.

Secured to the shaft 17 below star wheel 16 is a gear 18 (Fig. 2) meshing with a gear 19 secured to a shaft 19ª, which has mounted thereon a gear 20, meshing in turn with a gear 21 on crank shaft 22 journaled in the supports 241 and 230 and extending through opening 9ª in gear 9 to a point above table 10 for imparting intermittent radial out and in movement to the arms 25 as hereinafter described. Gear 21, although adapted to rotate shaft 22 for imparting radial movement to the arms 25, is also slidably and relatively rotatably mounted on shaft 22 for reasons and by means hereinafter referred to.

By way of example, if the pinwheel 14 has twenty revolutions per minute, the star wheel 16 will rotate 90° in ¾ of a second and have a rest of ¼ of a second. Gear 21, through the transmission above described from star wheel 16, will rotate 360° in ¾ of a second and have a ¼ of a second rest between each operation. The star wheels 6 and 16 operate alternately to alternately rotate the table 10 and with it the arms 25 and then move the arms 25 radially out and in.

Referring to Figs. 1, 3 and 6, secured to and above the table 10 is a bracket comprising vertical uprights 244 and plate 227 mounted on uprights 244 and constituting a crank shaft upper bearing plate. The crank shaft 22 between table 10 and plate 227 is provided with three cranks 22$^a$ arranged 120° apart as shown more clearly in Fig. 1 (see also Figs. 3 and 6). Links 23 connect a plurality of radially-arranged arms 25 slidably guided in bearings 24 on table 10 to the cranks 22$^a$. The arms 25 are arranged equidistances apart, and in the present embodiment 120° apart, being slidably mounted upon the rotatable table 10 and movable radially out and in away from and towards the center 22 by means of the crank pins 22$^a$ and connecting links 23. At their outer ends, the arms 25 are provided with mica gripping members or jaws 26, more clearly shown in Figs. 4 and 5. Each member 26 comprises a lower fixed flared jaw 26$^a$ and an upper movable flared jaw 26$^b$ pivoted by a pin 26$^c$ and held normally in closed position against the lower jaw by means of a spring 26$^d$ coiled around the pin 26$^c$ and engaging the jaws. The upper portion of lower jaw 26$^a$ is provided with a transverse vertical rib 26$^e$ spaced inwardly from the edge of the jaw, forming a ledge 26$^f$ for receiving the mica $m$ as shown in Fig. 5 and also in Fig. 17. Preferably, the outer edges of the jaws 26$^a$ and 26$^b$ are shaped to conform with the edge of the mica with which it is adapted to engage as shown in Figs. 17 and 18. The jaws 26 should be of sufficient width to properly engage or grip the mica. Each pivoted jaw 26$^b$ is provided with an upwardly and rearwardly extending finger 26$^g$ whereby the upper jaw may be opened relative to the lower jaw by means hereinafter described, whenever needed. In Fig. 5, a member 26 is illustrated gripping the forward edge of a piece of mica drawn down from the mica magazine, while in Figs. 17 and 18 a member 26 is in position to release the mica to the condenser building stand. Each upper jaw 26$^b$ is also provided with an inwardly-extending edge 26$^h$ co-operating with the rib or edge 26$^e$ on the lower jaw whereby the edge of the mica is securely held when being removed and transferred to the several locations to be operated upon.

*Counter mechanism.*

There is also provided suitable counter mechanism whereby the machine may be automatically stopped after a predetermined number of operations. The counter mechanism is driven from a counter main gear or bevel 27, Fig. 3, secured to the main drive shaft 3 above the gear 2 and meshing with gear or bevel 28 secured to one end of a shaft 29 mounted in suitable bearings 30 on the tables 230 and 241 (see Fig. 3). To the opposite end of the shaft 29 is secured a bevel 31 (see also Fig. 2). The bevel 31 meshes with a gear or bevel 32, mounted upon a lower end of vertical shaft 33 journaled in a suitable support 33$^a$ suspended from the table 241 (Fig. 3) and also having a bearing in the support 241. Secured to the gear 33 above the hanging support 33$^a$ is a gear 34, which meshes with a gear 35 secured to a vertical shaft 36 journaled in the hanger 33$^a$ and table 241. The shaft 36 extends above the table 241 and has secured to its upper end a rotatable disc 37$^a$ having a vertical pin 37 extending upwardly therefrom constituting a driving pin of the counter mechanism. (See also Fig. 19.) Upon each revolution, 360° for each mica and foil laid, of the pin 37, it engages one of the several circumferentially-arranged horizontal pins 38 projecting radially from a units wheel 39 moving the wheel 39 a distance of 24°. This units wheel is secured to a vertical shaft 39$^a$ journaled in the tables 228 and 241. A ratchet wheel 40 (Figs. 3 and 19) and a resetting gear 41 integral with the ratchet wheel 40 are rotatably mounted on shaft 39$^a$ above wheel 39. Pawls 42 are pivoted to a disc 42$^a$ keyed or secured to the upper portion 43 of the shaft 39$^a$ and engage the ratchet 40. The ratchet 40 and resetting gear 41 are rotatably mounted upon the shaft 39$^a$ but are constrained by pawls 42 to rotate the shaft 39$^a$ when moved in one direction but not when moved in the opposite direction. Coacting contacts 44 and 45 actuated by the counter mechanism are provided for controlling the circuit of the machine to automatically stop it (see Fig. 20). The contact 44, Figs. 2, 3, and 19, projects from and is mounted upon the member 42$^a$ which rotates it and is electrically connected to a slip ring 47 mounted on the top. A suitable support 46 on member 42$^a$, of insulating material, is provided for supporting the slip ring 47. A brush 48, Fig. 2, secured to a suitable insulating support 49 secured to the bottom of table 228, engages the slip ring 47 for connecting it on the circuit. The contact 45, which is arranged to periodically engage contact 44, is electrically connected to a slip ring 50 mounted on an insulating support 51 secured on a vertical shaft 51$^a$ journaled in the tables 228 and 241. This slip ring 50 is engaged by a second brush 48$^a$ connecting it to the circuit and mounted on a suitable insulating support 49$^a$ secured to the bottom of table 228. A fifteens wheel 52 is secured to the shaft 51$^a$ below support 51. This wheel 52 is provided with fifteen radially-extending horizontal pins 53 which are engaged periodically by a pin 53′ mounted upon and projecting below the member 42$^a$ near the perifery thereof for imparting movement to contact 45 (see Figs. 2 and 19). The pin 53′ is 12° in advance of contact 44. Upon each revolution of the member 42$^a$, the wheel 52 is given a 24° turn. A resetting gear 54 (Fig. 19) is rotatably mounted on the shaft 51$^a$ at a point so as to be in the same plane with reset gear 41. To the resetting gear 54 is secured a ratchet 55, Figs. 3 and 19. Pawls 56 are pivoted to a disc 56$^a$ secured to the shaft 51$^a$ below ratchet 55, pawls 56 engaging the ratchet 55, whereby the shaft 51$^a$ is rotated through pawls 56 in one direction but not in the opposite direction when the resetting gear 54 is moved in opposite directions. The means for actuating the resetting gears is described hereinafter. In order to maintain the shafts 39$^a$ and 51$^a$ with their counters in fixed position when not in operation, there are provided at their lower ends counter detents 57, Fig. 3, with which engage the spring pressed fingers 58. These counter detents 57 have a plurality of depressions 57$^a$ in the perifery thereof, with which depressions the spring fingers 58 coact, whereby the shafts are held in fixed position when not in operation, although the spring fingers 58 allow the rotation of the shafts when actuated by the pin wheels. Reset racks 59 and 60 engage respectively, when actuated as hereinafter more fully described, the fifteens wheel reset gear 54 and the units wheel reset gear 41, the racks 59 and 60 being provided with teeth upon their outer edges at an intermediate portion thereof adapted to engage the gears 41 and 54. In Figs. 2 and 3, the racks are shown in inoperative position out of engagement with the reset gears, while in Fig. 19 they are shown in operative position in engagement with the reset gears. The racks 59 and 60 are slidably or adjustably secured upon opposite edges of a support 61 in the manner of a slide rule, and are retained together against support 61 by means of a guiding support 61$^a$ secured to table 241. Suitable vertical guide screws 62, one of which is secured to guide 61$^a$ and the other of which is secured to table 241, extend through longitudinal slots 62$^a$ in the reset rack support 61 for maintaining the position of the racks and guiding them. To the rear end of the member 61 is secured a support block 63, which slides on table 241, for supporting the racks 59 and 60 above the plane of the table 241 and in the plane of the reset gears, 41 and 54. The racks 59 and 60 can be independently adjusted by loosening the detent or crosspiece 63$^a$ adjustably secured to the support 63 by a screw and provided with projections 63$^b$. The projections 63$^b$ on the detent 63$^a$ co-operate with a plurality of holes or depressions 63$^c$ on the racks and bearing suitable numerals indicating the number of sheets to be stacked. As an example of an embodiment of the resetting mechanism, the resetting gears 41 and 54 may have, say, 30 teeth each. The rack 59 may have 38 teeth, while rack 60 may have 36 teeth. In any case, there should be more teeth on the racks than on the resetting gears, so that each rack is capable of giving a complete revolution to its resetting gear. On the rack 59, behind the teeth of that rack, are 15 holes 63$^c$ arranged in the same straight line and equally spaced. The distance between the centers of adjacent pairs of holes is equal to twice the rack pitch. In like manner, the rack 60 has 15 equally spaced holes 63$^c$ in the same straight line with the distance between the centers of each pair of adjacent holes equal to twice the pitch of the rack 60. The teeth are so positioned on the racks that when the holes marked 0—0 are connected by the crosspiece 63$^a$ and the racks actuated from the position shown in Fig. 2, the end teeth on the racks will just engage the resetting gears. The holes 63$^c$ of rack 59 are numbered 0, 15, 30, etc. (multiples of 15), while the holes 63$^c$ of rack 60 are numbered 0, 1 to 14. By properly adjusting the racks 59 and 60 relatively to each other after the machine is started by actuating of the racks as a unit, it will automatically stop after any desired number of operations within the range of the machine and depending on the position of the member 63$^a$ relative to the holes on the two racks. When the sum of the readings connected by crosspiece 63$^a$ is 0 or multiples of 15, their sum directly indicates the number of operations of the machine before stopping. When the desired number of operations before stopping is not a multiple of 15, the machine will stop after the number of operations indicated by the sum of the numbers connected by member 63$^a$ less 15. For example, when the racks are arranged as shown in Fig. 19, the machine will stop after 141 operations (150+6−15=141). To cause the machine to stop after 180 operations (180 being a multiple of 15), set the racks 59 and 60 so that member 63ª is on 180 of rack 59 and on 0 of rack 60. After the racks are adjusted to position member 63ª at the desired holes 63ᶜ, the racks are actuated as a unit to the position shown in Fig. 19 separating contacts 44 and 45 through gears 41 and 54 and then released, the ratchets allowing the return without affecting the position of the contacts 44 and 45. The machine will then automatically stop after the indicated number of operations, for example 141 operations. The means for actuating the reset mechanism disclosed in Fig. 19 will be described more fully hereinafter.

When the contacts 44 and 45 engage after a predetermined number of operations as indicated and determined by the positions of the racks on the support 61 and the machine is to be stopped, an electromagnetic lock 64, Figs. 3 and 20, comprising a magnetic coil 64ª in the circuit of the machine and controlled by contacts 44 and 45 and a movable plunger armature 64ᵇ pressed forward towards the shaft 3 by means of a spring 64ᶜ operates to lock the machine against movement. During the operation of the machine, however, the plunger is held in the position shown in Fig. 3 and Fig. 20. When the machine is to be automatically stopped, the plunger 64ᵇ is released, the coil 64ª being shortcircuited by contacts 44 and 45, and engages a co-operating locking member 65 secured to the shaft 3 to rotate therewith and provided with an opening 65ª therein. The lock 64, 65 in co-operation with the magnetic brake hereinafter more fully described will definitely stop the machine when the plunger 64ᵇ enters the opening 65ª, which occurs after pin 37 disengages the counter wheels to allow the subsequent operation of the resetting means.

*Mica magazine and pick-up mechanism M.*

Referring to Figs. 1, 3, 4 and 5, there is secured to the upper fixed support 228, adjacent to the rotatable table 10, a block 66ª to the opposite sides of which are secured vertical angular plates 66 extending upwardly and inwardly towards the rotatable table. The members 66 constitute a support for a transversely arranged tripping device 67 pivoted at 67ª between the members 66 adjacent their inner ends. The tripping device 67 hangs downward into the path of movement of the upward and rearwardly extending fingers 26ᵍ of the gripping members 26 of the several members 25. The jaw trip 67 is held in downward position against stop 67ᵇ by means of a spring 68 secured at one end to the lower end of the trip 67 and at its opposite end to a cross rod 68ª secured to the supports 66 back of the stop 67ᵇ. As the several gripping members 26 pass beneath the trip 67, they will be opened by reason of their engagement therewith, and when they close, after passing the trip, grip a piece of mica as shown in Fig. 5. On the return movement of the jaws 26, the trip 67 yields to allow their removal.

Arranged transversely of the members 66 is a vertically and angularly arranged member 69 which constitutes the front guide or abutment for the mica stack 70 supported in a magazine 71. The bottom of the stack rests upon an upwardly and inwardly extending stack base 72 mounted upon the top of the block 66ª. The front edge 72ª of the base 72 is spaced a sufficient distance from the abutment or front guide 69, the base 72 being at right angles thereto and substantially in line with its lower edge.

In the present embodiment of the invention, referring to Fig. 5, the stack 70 is supported over substantially about one-half of its bottom surface. The weight of the stack as shown in Fig. 3 (on which may be placed an additional weight not shown, if so desired, for maintaining pressure on the stack) is sufficient to hold the stack on the semi-base 72, the lower sheets of mica being in engagement with the vertically-extending guide or abutment 69, which is arranged at right angles to the surface of the part 72. The stop or abutment 69 serves to aline the adjacent edges of the mica sheets and prevent more than one sheet from being drawn out at a time. The magazine 71 is secured to the base 72 by means of angles 71ª, and comprises a back 71ᵇ and sides 71ᶜ which are flared out at their forward vertical edges 71ᵈ. The forward edges 71ᵈ engage the member 69 and the sides 71ᶜ extend beyond and below the base 72 as indicated at 71ᶠ. The stack 70 is supported at a slight angle to the horizontal as shown, so that when a mica sheet is lowered as hereinafter described, its forward portion will be substantially horizontal and suitably positioned to be gripped by the members 26. In order to draw down the lowest sheet of mica in the stack 70 to a position where it is accessible to be gripped by the members 26 as above described, there is provided means which is movable into engagement with the bottom sheet of mica to draw it down, and in the present embodiment this means involves the use of suction or a vacuum. For this purpose, a vacuum cup support 73 extends transversely beneath the members 66 and below the stack 70 as shown more clearly in Figs. 4 and 5, and is provided at its outer ends with upturned ears 73ª pivoted in angular bearings 74 secured to the base 228. The axis of the vacuum support 73 is on a line coinciding with the inner edge 72ª of the base 72, thereby allowing a full and free bending or flexing of the individual mica sheets as they are brought down. Upon the vacuum support 73 is mounted a vacuum cup 73ᵇ having a passage 73ᶜ therethrough communicating with a passage 73ᵈ in one bearing 74 of the vacuum support 73. The vacuum cup 73ᵇ may have any desirable shape. The upper edge which is to engage the mica is provided with a cushion 73ᶠ of relatively soft material such as rubber in order to better engage the mica and provide air-tight contact. The passage 73ᵈ is connected by means of a rubber tube 75 (Figs. 1 and 3) with a valve mechanism controlled as hereinafter described and adapted to alternately connect and disconnect the vacuum cup 73ᵇ with suitable evacuating mechanism (not illustrated) and with the normal atmosphere. This vacuum mechanism may consist of any well-known means of producing a vacuum and maintaining it. When the vacuum cup 73ᵇ is raised against the bottom sheet of mica by the mechanism hereinafter described and the vacuum applied, the sheet of mica or other material which it is desired to pick up is sucked against the cup and, as the latter is lowered, the mica is drawn down with it, substantially as shown in Fig. 5, flexing around the edge 72ᵃ. The superimposed sheets above it in the mica stack 70 drag against the abutment 69 and are more or less fanned out substantially as shown when the lowermost sheet is drawn down, where they are accessible to be engaged upon successive actuations of the vacuum cup. The stop or abutment 69 thus prevents more than one sheet of mica from being pulled out at a time by the members 26.

The valve as embodied in the present application of the invention comprises a valve casing or block 76 in which is slidably mounted a valve stem 77, Fig. 4. The valve stem 77 is provided with a transverse passageway 77ᵃ extending through the same, and a longitudinal passageway 77ᵇ communicating at one end with the central portion of passageway 77ᵃ and having at its opposite end an angularly-arranged passageway 77ᶜ extending to the block 76. A passage 77ᵈ extending through block 76 and leading to the vacuum cap 73ᵇ through tube 75 is adapted to aline with passageways 77ᵃ and 77ᶜ alternately. The block has a passageway 77ᵉ therethrough communicating with the atmosphere, and another passageway 77ᶠ therethrough communicating with the vacuum mechanism. Passageways 77ᵉ and 77ᶠ are arranged to aline with passageway 77ᵃ alternately. In the position of the valve stem 77 shown in Fig. 4, the passage 77ᵃ is in alinement with the passage 77ᵉ communicating with the atmosphere, which, through the tube 75, places the vacuum cup 73ᵇ in communication with the atmosphere, whereby the vacuum cup releases the mica sheet immediately after the mica sheet is engaged by any member 26. When the valve stem 77 is moved to the other extreme (to the left in Fig. 4) by the mechanism hereinafter described, the passage 77ᵃ alines with the passages 77ᵈ and 77ᶠ placing the vacuum line 75 and the cup 73ᵇ in communication with the vacuum apparatus, the cup 73 then being in its raised position. As more fully described herein, the movement of the valve stem is accompanied by a movement of the vacuum cup support 73.

The valve stem 77 is controlled by a snap action by mechanism which includes a valve lever 78 extending at an angle from the stem 77 over the base 228. The end of lever 78 adjacent to the valve stem 77 has an ear 78ᵃ extending between the bifurcations 78ᵇ (Fig. 3) on the end of the valve stem. Secured to the ear 78ᵃ is a vertical pin 78ᶜ extending upwardly and downwardly through transverse slots 78ᵈ in the bifurcations 78ᵇ. The opposite end of lever 78 is pivoted by an ear or pivot 78ᵉ to a support 78ᶠ secured to table 228 at a point in a line substantially at right angles to the axis of stem 77 and passing through or close to pin 78ᶜ. The movement in opposite directions of the stem 77 and lever 78 is limited by means of stops 79 in the path of movement thereof. A roller support or slide 80 is slidably supported and mounted on the base 228, and has a cam roller 81 at its inner end overlying the rotatable table 10 at a point adjacent its perifery. The slide 80 is movable back and forth on a line substantially parallel with the line of movement of the stem 77. A pair of coil springs 82 are connected to a vertical pin 82ᵃ on the slide 80 at points above and below the upper portion thereof as shown in Fig. 5. These springs 82 extend towards the valve stem 77 and are connected to the pin 78ᶜ of lever 78 (Fig. 4) at opposite sides of stem 77. The point of connection 82ᵃ of the springs 82 to the slide 80 is such that, in one position of the slide 80, the springs exert a force on the end of lever 78 along a line at one side of pivot 78ᵉ, while in another position or opposite position of the slide 80 the line of connection lies on the opposite side of pivot 78ᵉ. Thus the movement of slide 80 causes the lever 78 to swing one way or the other around its pivot 78ᵉ with a snap due to the springs 82 and thus quickly actuating the valve stem 77. In the position shown in Fig. 4, the springs are in such position relatively to the several pivots as to cause the valve to be thrown to the position shown. As the slide 80 is moved inwardly toward the center of table 10 by the mechanism hereinafter described, the springs 82 will be thrown to the opposite side of pivot 78ᵉ, quickly moving the valve to vacuum applying position.

The slide 80 comprises a lower supporting member 83 slidably mounted upon the base 228 between a pair of spaced guides 84. The member 83 extends upwardly and is secured to the upper portion 83ª of the slide, while between the portions 83 and 83ª at the rear which are spaced is placed a block 84ª (Fig. 5). There is thus provided a guide having portion 83ª sufficiently elevated above table 228 to allow a free movement of the springs 82 and to which the roller 81 may be mounted above table 10. The lower surface of the member 83 of the slide 80 is provided with a plurality of longitudinally-arranged recesses 84ᵇ with which are adapted to engage balls 85 pressed upwardly against the member 83 by means of springs 86 in recesses 85ª in the base 228. By this means, the slide 80 is held firmly in either position in which it is placed by the mechanism hereinafter described. The movement of the slide 80 also controls the movement of the vacuum cup support 73. For this purpose, the rear portion of the slide 82 is bifurcated as indicated at 86ª, and pivoted at one end therein is a link 86ᵇ which is pivoted at its opposite end to one end of a link 86ᶜ. The opposite end of link 86ᶜ is pivoted to a downward projecting bracket 86ᵈ secured to the bottom of vacuum cup support 73. The links 86ᵇ and 86ᶜ constitute a toggle whereby upon the outward movement of the slide 80, that is, away from the table, the vacuum cup 73ᵇ is lowered, and upon movement of the slide towards the center of the table 10 the vacuum cup is raised. A spring 86ᵉ is secured to the top of link 86ᶜ and engages the frame above it to hold the links 86ᵇ and 86ᶜ down and in operative position. A vertical pin 86ᶠ is secured to the outer portion of the member 80 and serves to support the vacuum cup 73ᵇ in its lower position. The pin 86ᶠ thus insures that the mica will be always located in the right plane to be gripped by the members 26. The slide 80 lies below the path of movement of arms 25 when the latter are moving outwardly to mica pickup position. In the present embodiment of the invention, each arm 25 is provided with a downwardly projecting pin 86ᵍ adapted to engage a part of the slide 80 and move it outwardly to mica lowering position as the arm 25 moves to a position to pick up mica. This pin 86ᵍ engages the pin 82ª as shown in Fig. 5. The cams 239 and 240 on table 10 move slide 80 in the opposite direction, as more fully described hereinafter. As each arm 25 moves outwardly to mica pickup position, the slide is moved by it to lower the cup 73ᵇ. The jaws 26 are opened by the trip 67 and then close on the mica as the cup reaches the lowermost position. At the same instant, the air is admitted to the vacuum cup releasing the mica therefrom. It will thus be seen that the movable slide 80 performs the dual function of controlling the operation of the vacuum cup and the valve controlling the admission of air to the vacuum cup or the application of suction.

*Actuating means for the resetting mechanism.*

The means for resetting the counter mechanism, by the racks 59 and 60, includes a reset crank 87 (Figs. 2 and 19). This crank 87 is pivoted to the table or support 241 at a point 87ª intermediate its ends and is pivotally connected at one end to the support 61 for the racks 59 and 60 by means of a pin and slot connection 87ᵇ. At its opposite end, the crank 87 is provided with a finger 88 which engages a counter lever 89 of a Veeder counter 90 (Fig. 1) whereby the number of resetting operations during a given time and hence the number of stacks built may be checked. A link 91 connects the crank 87 to a slidable actuating member or reset lever 92. Suitable means is provided in connection with the reset lever 92 for preventing an incomplete operation thereof, Fig. 2; that is, for rendering it necessary to pull the lever 92 entirely back before it can be released. For this purpose, there is provided a back motion lock 93 overlying the lever 92 and comprising a segmental part having along its curved edge a series of teeth 93ª, pivoted at 93ᵇ to the base 241, and having a pin and slot connection 93ᶜ with the slide 92 (Fig. 2). As the slide 92 is pulled from the left (Fig. 2), the segment 93 will be rotated around its axis 93ᵇ, and the teeth 93ª will immediately engage the end of a back motion lock pin 94 lying in the path of movement of segment 93. The pin 94 is pivoted on table 241 intermediate its ends and has connected thereto a spring 95 anchored at one end 96 to the base 241 and at the other end 96ª to the pin 94, maintaining the two points of connection of the spring and the pivot of pin 94 normally in alinement and in line with pivot 93ᵇ. As the member 93 then is moved rearwardly, it engages the pin 94, which prevents the return of the resetting slide 92 until it has been drawn back by the operator to its limit.

The reset lever 92 is suitably supported and guided on a support 97 on the frame 241 and is held in alinement and guided by means of a pin 97ª on the support riding in a longitudinal slot 97ᵇ in the slide 92. A suitable actuating handle or a reset lever handle 98 (Fig. 2) is provided at the front of the machine for moving the slide 92 in one direction to reset the mechanism, and a coil spring 99 secured at one end to the base 241 by means of a pin 100 and secured at its opposite end 100ª to lever 87 at a point between the pivots 87ª and 87ᵇ automatically moves the slide 92 and connected parts to inoperative position when handle 98 is released. When handle 98 is pulled by the operator, the counting mechanism is reset ready for a second operation and upon the release of the handle 98 the racks 59 and 60 move rearwardly without affecting the recounting mechanism because of the pawl and ratchet connection between the gears engaging the racks and the counting mechanism.

*Foil punching and laying mechanism F.*

The transmission mechanism for driving the punching and laying mechanism from the main shaft 3 comprises a gear 102 (Figs. 2, 12 and 13) suitably journaled in and between a gear support plate 103 and the table 241 from which the plate 103 is suspended and spaced by means of a block 104. As shown in Fig. 2, gear 102 meshes with gear 12 upon shaft 13, which gear 12 has already been described as meshing with gear 11 on main shaft 3. Gear 102 meshes with a gear 105, likewise journaled in and between the gear support 103 and table 241. Gear 105 meshes in turn with a gear 106$^a$ supported between table 241 and plate 103 and mounted upon a shaft 106$^b$ extending above table 241 and to which is secured a gear 106 above the table 241. Gear 106 meshes with floating gear 107 located between tables 241 and 228 and slidably supported on table 228 by shaft 107$^a$ extending through slot 107$^b$ in table 228 and having a head 107$^c$.

Links 108 (Figs. 2 and 12) are connected at one end to the shaft 106$^b$ of gear 106, and at their opposite end to shaft 107$^a$ upon opposite sides of gear 107. A link 109 is connected at one end to the shaft 107$^a$ below gear 107 and at its opposite end to the lower end of vertical shaft 111 of gear 110 which is driven from and meshes with gear 107. The shaft 111 is journaled and supported in a base 130 adjustably mounted on platform 228 and projects through a slot 111$^a$ in the platform 228, gear 110 being secured to its shaft below platform 228. The connecting links 108 and 109 brace the gears to which they are connected and allow movement of gear 110 without disengaging gear 107 upon the positioning of base 130 to properly locate it on the machine. To the upper end of shaft 111 is secured a bevel 112 (see also Fig. 1), which meshes with a co-operating bevel 113 (see Figs. 1, 12 and 13) secured to one end of a horizontal shaft 113$^a$ journaled in a bearing 113$^b$ upon base 130. To the opposite end of shaft 113$^a$ is secured a gear 114. Gear 114 in turn meshes with a gear 115 suitably journaled in the framework, which in turn meshes with a gear 116. Gear 116 is secured to a shaft 117$^a$ spaced above the base 130 and journaled in spaced vertical bearings 117 (Figs. 1 and 12) upon punch base 130. Shaft 117$^a$ is arranged transversely to the direction of movement of arms 25 to mica depositing position.

A spacer or sleeve 118 is mounted upon the shaft 117$^a$ and upon the shaft 117$^a$ at opposite ends of spacer 118 are keyed or fixed a pair of cam wheels 119, which cam wheels are spaced apart by the sleeve 118 and are interposed between sleeve 118 and the bearings 117. The cam wheels 119 on their inner surfaces are provided with eccentric cam grooves 119$^a$ (Figs. 13 and 14, which figures illustrate two different positions of the cam wheels 119). Cam followers 120, which may be rollers or pins, ride in the grooves 119$^a$ of the cam wheels 119. These pins or wheels 120 are secured to opposite sides of an inner punch slide 122 located below the sleeve 118 and slidably mounted between vertically sliding parallel parts of a male punch supporting member 121. To the inner spaced vertical surfaces of the member 121 are secured punch slide plates 253 secured by screws 253$^a$ and providing suitable bearing surfaces for member 122. To the lower end of the inner slide 122 is removably secured a foil-placing block or plunger 123. Secured in an opening in base support 130 is a female foil cutting die 124, having an opening which corresponds with the size and shape of the foil sheets desired. Secured to the lower ends of the member 121 by means of the bolts 121$^a$ is the male die 125. The lower end of the male die 125 has a configuration which closely fits the opening in the female die for evenly and efficiently cutting the foil and is provided with a central opening 125$^a$ in which the head 123 may fit when in the position shown in Fig. 13. As shown more clearly in Figs. 13 and 14, the slide 122 can be fixed relative to the support 121 in the position shown in Fig. 13 by a pair of slide detent balls 250 located in a transverse opening 250$^a$ in the slide 122 and held in spaced-apart relation against the bearing plates 253 of the support 121 by means of an interposed coil spring 251. In the position shown in Fig. 13, these balls 250 engage recesses or indentations 251$^a$ located in the bearing surfaces 253, whereby the support 121 and male die 125 move with slide 122 during part of the travel of the slide as more fully described hereinafter. Support 121, to which the male member 125 of the die is secured, is slidably mounted and guided by a pair of guide pin bearings or sleeves 126 and 128 secured to the support 121 and sliding on vertical pins 127 and 129 fixed to the punch base 130. Bearing 128 is arranged diagonally with reference to the bearing 126 and the guiding means are located at opposite sides of the support 121, Fig. 1, whereby alinement of the male and female dies is secured. The dies 123 and 125 should have minimum clearance and minimum entry. This is secured in part by the guides 126 and 128 and pins 127 and 129, which are properly ground for best results. The lower ends of the pins 127 and 129 are threaded and upon the threaded portions of the pins are adjustable stop nuts 249. These nuts form a stop limiting the downward movement of the support 121 and male die 125. By adjusting nuts 249, the distance that the male member 125 enters the female member 123 can be accurately determined. The table or punch base 130 supporting the foil punching mechanism is spaced above table 228 by a number of legs 130$^a$ so that the arms 25 may reach the stack building stand located beneath the punching mechanism.

The inner members 122 and 123 are provided with a longitudinally-extending air passage 123$^a$, which terminates at the lower end of the member 123 in a flared opening 123$^b$. The air passage 123$^a$ extends longitudinally towards the upper end of the member 122 and is angularly deflected forming a passage 123$^c$ extending to the walls 253. An air passage 123$^d$ communicating with a suitable source of compressed air (not shown) passes through support 121 and face plate 253 at such point as to aline with passage 123$^c$ when the latter is in its lowermost position. In the position shown in Fig. 13, the die 125 and member 123 are raised and the source of compressed air supply is cut off. In the lower position, Fig. 14, not only is the male member of the die entering the female member of the die, but the inner slide 122 with its head 123 has moved downwardly relatively to supports 121 to deposit the foil, which has just previously been severed, upon the stack, as more fully described hereinafter. In this last position, the foil is spread over the mica by means of compressed air escaping through the opening 123$^b$. When the cam members 119 are in the position shown in Fig. 13, the member 122 is locked to the die support 121 by means of the balls 250 and subsequently all are carried downwardly together by the cams 119. The downward movement of support 121 and the male die 125, although sufficient to stamp out the foil sheet, is limited by the engagement of the bearings 126 and 128 with the stop nuts 249. Thereupon the tension of the spring 251 is overcome and the balls 250 are moved inwardly out of the notches or depressions, and the member 123 moving independently of the die 125 carries the foil, just stamped out, downwardly into position on the stack. The foil placing block 123 is then elevated by the cams 119, shutting off the compressed air, until the balls 150 enter the notches 251$^a$. The support 121 and die 125 with block 123 are then raised as a unit to a position ready for the next operation. The member or foil placing block 123 is of an area approximately the area of the foil sheets to be laid and in engaging the stack being built causes a step by step depression of the stack stand as more fully described hereinafter. In view of the relatively close contact of the bottom of member 123 with the foil it has just placed on the stack, the compressed air escapes through the restricted space between the block 123 and foil in all directions, causing the foil to be evenly and smoothly laid upon the stack and adjacent mica sheet and forcing it from member or plunger 123.

In the present embodiment of the invention, the conduit for the compressed air comprises a compressed air pipe 252 connected to the passage 123$^d$. This pipe 252 terminates in the bearing sleeve 128, sliding on pin 129, Fig. 12, the latter being provided with a passage (not shown) leading to the source of compressed air and communicating with pipe 252. There is thus provided means for efficiently conveying compressed air from a fixed part to a moving part. Any suitable gas or fluid may be substituted for compressed air for the purpose of spreading out the foil on the mica or for any purpose such as the application of an insulating fluid.

*Stack building stand mechanism.*

The foil as it is cut out by the above-described punch is deposited on a stack which is being built on a stand as more fully described hereinafter. In order to bring out the terminals at different portions of the stack, the punch and stack stand are moved relatively to each other after each operation. In the present embodiment of the invention, the stand after each sheet of foil is deposited is rotated 180° so that the foil sheets project alternately, from the stack, providing terminals. To cause this rotation, a gear 131 is secured, below table 230, to shaft 7 to which the Geneva gear 6 is secured (Figs. 2 and 3). Gear 131 therefore rotates 90° in a quarter of a second when the table 10 rotates 120° in the same quarter of a second. Gear 131 meshes with gear 132 (Figs. 2, 3, 12, 13 and 15), located below the lower platform or support 230 and secured to a shaft 246 journaled in the platforms 230 and 241. A link 133 pivoted at one end to the bottom of shaft 246 below gear 132 constitutes a lower support or bearing for a gear 134 journaled loosely or adjustably at its upper end in the support 230 and meshing with gear 132. Gear 134 meshes with a gear 135, which is secured to a rotatable stack building stand S' mounted below the dies 124 and 125 and plunger 123. A link 247 (see also Fig. 16) is pivoted at one end to the mounting for gear 135 and at its opposite end to the shaft, supporting gear 134. The links 133 and 247 with the support for gear 134 in table 230 allow adjustment of stack support S' and gear 135 as more fully explained hereinafter.

The stack support or building stand S' (Figs. 1, 2 and 12 to 18) is rotatably mounted on a forward and rearwardly sliding plate 135ª (Figs. 1, 2, 12, 15 and 16) in turn mounted in an opening 135ᵇ in platform 230 below the foil laying mechanism and having guideways 135ᶜ whereby the building stand can be adjusted to position it at the right point below the foil laying mechanism. A circular plate 136 is secured by screws 136ª (Fig. 12) to the bottom of a circular building stand 137 rotatably mounted in an opening 137ª in plate 135ª. Rotatable member 137 is retained on platform 135ª by means of a pair of guides 138 spaced from each other, secured to the top of member 137 by screws 138ª and overlapping the top of plate 135ª (Figs. 2, 12 and 15) and by means of bottom plate 136, which in like manner overlaps plate 135ª. Gear 135 above mentioned is secured or keyed to plates 136 and 137 to cause the rotation thereof, the gear 135 being rotated 180° in a quarter of a second by its transmission mechanism above described. The guides 138 have inner spaced edges 138ᵇ which are parallel to each other as shown more clearly in Fig. 15.

A base or rod spacer 139 is removably mounted upon the rotatable member 137 between the slides or guides 138 as shown more clearly in Fig. 15. Secured to base 139 are four vertical spaced rods 140 arranged as shown in Fig. 15, extending from base 139 to points above platform 228 but below punch base 130 and adapted to support the stack building stand as hereinafter described. These rods 140 are arranged substantially to form a rectangle, and have their inner portions notched longitudinally forming grooves 140ª (see Figs. 2, 14 and 17), into which the corners of the building stand and mica sheets are adapted to fit as more fully described hereinafter.

In order to lock or secure the rotatable member 137 in position after each 180° actuation and while it is at rest, and to definitely aline the stack building stand and rotatable member 137, a pair of oppositely and radially-arranged and inwardly-extending recesses 137ᶜ (Figs. 15 and 16) are provided in member 137 and in which are balls 137ᵈ pressed by coil springs 137ᵉ into notches 137ᶠ in the slide plate 135ª. As the member 137 is rotated by gear 135, balls 137ᵈ will be retracted. After each 180° rotation, the balls again enter the notches and lock the member 137 against movement.

The whole building stand, including the plate 135ª, is slidably mounted as above mentioned in the support 230 in order to secure refinements of adjustment so as to properly locate the building stand with reference to the punching and other mechanism. For this purpose, a threaded rod 137ᵍ is secured at one end to the member 135ª by means of a pin 137ʰ, while rotatably mounted on the platform 230, and secured against radial movement thereon is a rotatable actuating member or nut 137ʲ threaded upon the threaded rod 137ᵍ. The member 137ʲ is provided with circumferentially-arranged depressions 137ᵏ, in which a spring-held detent 137ᵐ is adapted to engage, whereby the slide plate 135ª is held in any given position of adjustment.

In order to allow the adjustment of the slide 135ª and the necessary adjustment of the gear 135 therewith, gear 134 is loosely journaled or supported in the platform 230, and has a link connection 133 with the shaft 246 of gear 132 and a link connection 247 with the shaft of gear 135, whereby the gears 132, 134, and 135 adjust themselves relatively to each other and are maintained in mesh upon the adjustment of the sliding platform 135ª.

Rod base 139 with the supporting rods 140 is removably secured in the guideways 138 and may be removed by sliding the same to the left (Fig. 2) out of the guides 138 and then lifting it off of the machine. The support 130 and platforms 228 and 241 are cut inwardly at the front or provide ample clearance (see Figs. 1 and 2) to allow the lifting of the member 139 and part supported thereon out.

Screws 138ª, securing the slides 138 to the rotatable member 137, have heads 138ᵉ which overlie the rod base 139 to retain it in position on the platform 137, while the slides 138 also are provided with recesses 139ᵇ (Fig. 15) in which are spring-pressed detents 139ᶜ, which engage in notches 139ª on opposite edges of the member 139 to retain and lock it in position upon the rotatable member 137 when it is inserted therein.

The gear train, beginning with gear 131 and ending with gear 135, is arranged to locate the rotatable stack building stand beneath the punch and laying mechanism previously described. The gear 131 rotates 90° in a fourth of a second, while the gear 135 is designed to rotate 180° in a fourth of a second, there being a three-quarters second rest between each operation.

The vertical rods 140 extend upwardly from the support 139 to which they are secured and terminate beneath the punch support 130 at a point substantially in line with the plane of operation of the members 26 as shown in Figs. 12, 13, 17 and 18. The members or rods 140 at their upper ends upon their inner portions have recesses 140ᵇ (Figs. 17 and 18), while secured to the outer portions of the upper ends of the rods 140 are spring members or fingers 141 (Figs. 17 and 18) secured by the screws 141ª and extending around the rods 140 into the recesses 140ᵇ to provide light spring detents 141ᵇ for locating and holding the mica sheets in place as they are released and dropped into the stack building stand past the detents 141ᵇ by the members 26. The arrangement of these spring detents 141ᵇ is more clearly shown in Fig. 17.

Referring to Fig. 17, the broken lines $xx$ indicate successive position of the forward edge of a mica sheet as it is being pushed between the rods 140 past detents 141ᵇ. The pair of detents 141ᵇ at the right of Fig. 17 converge inwardly and are pressed back as shown in broken lines as the mica sheet is inserted. When the mica reaches the full line position, the detents at the left which also converge inwardly act as stops for the adjacent edge of the mica, and the detents at the right spring in back of the edge at the right holding the sheet in place as the members 26 withdraw. Upon the next insertion of a mica sheet by members 26, owing to the 180° rotation of the building stand, the detents shown at the left will then be at the right and operate as above described. The detents 141ᵇ are so arranged as to allow the insertion of the mica sheets, but prevent their withdrawal as the members 26 draw inwardly away from the stack building stand.

Located beneath the springs or detents 141 is a platform 142ª (Figs. 17 and 18) slidably mounted on rods 140 and on which the stack is built and frictionally and resistantly engaging the rods 140 by means of friction springs 142 secured between their ends to opposite sides of platform 142ª and embracing and slidably and frictionally engaging the rods 140 at their ends. This platform 142ª is so arranged upon the rods 140 that upon each operation of the plunger 123 to the position shown in Fig. 14, the stack and platform 142ª will be moved by it downwardly substantially the distance of the thickness of a sheet of mica and superimposed foil sheet, this movement, however, being resisted by the springs 142. The platform 142ª of the present construction comprises a rod guide or base 143 slidably mounted upon the four rods 140 to brace them and maintain their distances constant at their upper ends. The base or guide 143 has an area greater than the area enclosed by the rods and is provided with holes 143ª through which the rods 140 extend. Secured to the top of the rod guide 143 by means of screws 144ª is a block or platform 145 for supporting the stack 144 and to which the springs 142 are directly secured as above described. The corners of the member 145 ride in the inner grooves 140ª of the rods 140, member 145 being the part on which the stack is built and conforms to the shape and size of the mica used.

As the several gripping members 26 move outwardly successively toward the stack building stand in order to deposit the sheets of mica thereon, a pin or jaw opening stud 146 (Fig. 13) engages the upwardly-extending tongues or fingers 26ᵍ of the movable jaws, opening the jaws 26ª and 26ᵇ before they have completed their outward movement. The pin or stud 146 is adjustably mounted in a slot 146ª (Figs. 1 and 13) whereby it can be properly positioned to open the several jaws 26 at the proper time. Thereafter the vertical abutment 26ᵉ upon the lower jaw is sufficient to move the mica and position it upon the stack in the manner shown in Figs. 17 and 18. After the mica is positioned upon the stack or building stand, the dieing mechanism previously described operates, the plunger 123 descends, and the stack building stand 142ª gives slightly under the impact of the plunger, maintaining the upper end of the stack substantially at a constant level to ensure proper deposition and placement of the mica sheets by means of the several members 26.

*Foil feeding mechanism.*

Before taking up the specific embodiment of foil feeding mechanism and describing the same, it may be well to point out the difficulties encountered in handling metal foil, usually tin or lead, of thicknesses of the order of 5/1000 inch used in building mica or other condensers. When foil of the above thickness and material is used, it is limp and tends to crumple. Likewise it has a tendency to adhere to a similar piece of foil in contact with it. I have solved the problem involved by carrying the foil in a strip form directly to the stack building position and punching out the foil plates or armatures by the means described as they are about to be deposited upon the stack, the foil being intermittently fed by the mechanism about to be described.

Fig. 1 shows in general the details of construction and position on the machine of the foil feeding mechanism. In the lower side of the view is shown the foil being unwound from its drum and passing beneath the foil punching and laying mechanism, while at the upper portion of the view is shown the foil with the spaces Y left by the foil punched out. The shape of the dies 124 and 125 conform to the shape indicated by spaces Y but the contour or shape of the dies will vary for condenser designs of different types. The spaces Y also indicate the way the foil sheets are laid upon the stack (also shown in Fig. 14). The foil sheets are laid with their terminal tabs projecting alternately beyond the straight sides of the mica sheets (see Fig. 17 for the shape of mica). The machine, however, is adapted for use in making condensers of other shapes. The transmission mechanism from the motor P for intermittently feeding the foil comprises a gear 147, secured below platform 241 to shaft 246, which is rotated through gears 131 and 132 of the stack building stand rotating mechanism (Figs. 2, 3, 12 and 13). Gear 131 is secured to shaft 7 rotated intermittently by the Geneva gears including star wheel 6 for rotating table 10. The foil is therefore fed while the table 10 is rotating 120°. Meshing with gear 147 is a gear 148 suitably journaled below the support 241. Meshing with gear 148 is a gear 149, likewise journaled below the support 241. Meshing with gear 149 is a gear 150 journaled below the support 241 between a pair of spaced support plates 151 attached to the bottom of platform 241 (Figs. 2 and 13) and spaced apart by a spacer 151$^a$. Journaled between the plates 151 and meshing with gear 150 is a gear 152, which in turn meshes with a gear 153 secured to the lower end of a vertical shaft 153$^a$ journaled in the support 241 and extending above the same (Figs. 2, 12 and 13). To the upper end of the shaft 153$^a$ is secured a bevel 154 which meshes with a co-operating bevel 155 secured to an end of a horizontal shaft 158 journaled in suitable bearings 156 supported above the platform 241 (Figs. 2, 12 and 13). A gear 157 is secured to shaft 158 at an intermediate portion thereof.

The foil feeding mechanism illustrated in the present embodiment of the invention comprises feeding devices mounted upon base 130 at opposite sides of the plunger and foil-cutting mechanism described, Figs. 1 and 12, and driven by the transmission mechanism just described. These feeding devices are operated upon one side of the plunger mechanism, at the side adjacent the foil drum hereinafter described, through gear 157 which meshes with a gear 162 journaled in brackets 162' secured to platform 228. Gear 162 meshes with gear 163 (Fig. 12), journaled in the plunger base 130. Gear 163 meshes with a lower feed roller gear 164, and with a gear 165 journaled in a suitable plate 176, the latter gear communicating movement to an upper feed roller gear 166 (Figs. 1 and 12). The gear 164 is secured to a lower roller 167, the roller 167 being journaled with the gear 164 upon the support 130. An upper roller 168 engaging roller 167, and to which is secured the gear 166, is journaled in vertical supporting plates 175 and 176 above the support 130. The upper roll 168 is spring-pressed into engagement with the lower roll 167 by means of a spring 169, the roller 168 being capable of limited vertical movement in its bearings 175 and 176. In order to communicate movement to the feeding device at the opposite side of the plunger mechanism, there is provided the shaft 170 (Figs. 2 and 12). Bevel 159 secured upon the opposite end of shaft 158 meshes with a bevel 160 upon shaft 170, the shaft 170 being supported in suitable bearings 161. At the opposite end of shaft 170 is secured a bevel 171 which meshes with a bevel 172 mounted on a horizontal shaft 172$^a$ journaled in bearings 173. Secured to the shaft 172$^a$ is a gear 157$^a$. Gear 157$^a$ meshes with a gear 162$^a$ above it, journaled in the platform 228, while gear 162$^a$ meshes with gear 163$^a$ journaled in the plunger support 130. Gear 163$^a$ meshes with a lower roll gear 164$^a$ and with an upper gear 165$^a$ journaled in a plate 174. Gear 165$^a$ meshes in turn with an upper roll gear 166$^a$. The gear 164$^a$ is secured to a lower roll 167$^a$ journaled in the support 130 (Fig. 12), while the gear 166$^a$ is secured to an upper feed roll 168$^a$ journaled in the vertical supporting plates 174 and 177 (Fig. 1). The upper roll 168$^a$ is pressed into engagement with the lower roll 167$^a$ by means of a spring 169$^a$ secured to one of the plates 174. The rolls 167 and 168, and 167$^a$ and 168$^a$ are arranged upon opposite sides of the foil dieing mechanism and with their lines of contact on a level with the upper surface of the base 130 (Fig. 12). As shown in Fig. 13 gear 162 (and also gear 162$^a$) is wider than gear 163 (and also gear 163$^a$) to allow adjustment of support base 130 to properly locate it without disengaging the gears. The foil strip 179 passes through the feed rollers, by which it is intermittently fed. The lines of contact between the feed rollers 167 and 168 and rollers 167$^a$ and 168$^a$ lie substantially in the same plane with the upper surface of the plunger support 130, so that as the foil is fed and while it is at rest it is supported, except where it passes over the female die 124, by means of the support 130.

A foil guide 178 under which the foil strip 179 passes is adjustably secured to the support 130 as shown in Fig. 1. Secured to the upper surface of the base 130 is a foil stripper 248 (Figs. 13 and 14) under which the foil passes, the stripper being spaced slightly above the upper level of the base 130. This stripper is provided with a central opening 248$^a$ corresponding in size and shape with and alined and registering with the opening in the female die 124. This stripper 248 prevents the foil 179 from being lifted on the upward movement of the dieing mechanism 125.

The foil strip 179 is rolled upon a foil spool or drum 180 (Figs. 1, 10 and 11). This spool is mounted upon the support 228 and comprises separable metal drum sides 181 and insulated hub 256 journaled in angular brackets 182 and 183 secured upon the base 228. A metal brush 184 is in contact with one drum side 181, which brush is connected by means of a lead 184$^a$ with the control circuits as hereinafter described for automatically stopping the machine should foil 179 break. On one drum side 181 is secured a metal spring finger 181ª which engages the foil 179 wound on the drum, a portion of the side 181 being cut away for this purpose. This arrangement insures good electrical contact of the foil with the drum. The spool 180 with its brackets 182 and 183 is supported upon and insulated from the machine by a plate 185 of suitable insulating material mounted on platform 228. A housing 186 mounted on platform 228 is provided, which comprises a semicircular portion 186ª enclosing the perifery or upper portion of the drum, and side screens 186ᵇ protecting the sides and bearings of the drum. The drum 180 is journaled upon brackets 182 and 183 by means of threaded spindle 187 extending transversely through the insulated hub 256 and drum sides 181 and supported on the brackets 182 and 183. Washers 187ª of suitable insulating material are interposed between the brackets 182 and 183 and sides 181. Bearing nuts 188 are threaded on the ends of the spindle 187 outside of the supports 182 and 183, whereby the parts are secured together and the frictional contact of the washers 187ª can be varied to regulate the feed of the drum and to impose enough resistance to prevent slack in the foil 179 during the feeding operation. The sides 181 are insulated from the spindle 187 and brackets 182 and 183, and the hub is of insulating material for purposes hereinafter pointed out. The bracket 182 is slidably adjustable on plate 185 so that the width of the drum can be varied for different width of foil strip. Hubs of different lengths may be used. The foil 179 is so wound upon the drum 180 that it comes off the drum tangentially at the bottom thereof and extends upward (see Figs. 10 and 12) over the curved edge 179ª of the support 130 whereby it is fed from the drum evenly with all creases and the like removed by reason of its contact with the edge 179ª and guide 178.

*Insulating compound applying mechanism or varnishing mechanism V.*

The varnishing mechanism or insulating compound applying mechanism V, which is located between the mica pick up mechanism and the foil depositing mechanism, is driven from the prime mover P of the machine through a gear 189 (Figs. 2, 3 and 6) secured on the main drive shaft 3 below the horizontal platform or table 241. Gear 189 meshes with a gear 190 of a train of gears. Gear 190 meshes in turn with a gear 191, which in turn meshes with a gear 192, which in turn meshes with a gear 193. The gears 190 to 193 (Figs. 2, 6 and 7) are secured to vertical shafts journaled at their upper ends in the table 241 and at their lower ends in a suitable gear support plate 241ª depending from the table 241. Gear 193 is secured to a vertically-extending shaft 193ª which extends above the support 241 at a point adjacent to the compound applying mechanism V. At its upper end, the shaft 193ª terminates in a wick operating cam 194 (Figs. 2, 6, 7 and 8) adapted to periodically engage depending arm 195 which is secured at its upper end to a pivoted wick support 197 above table 228. A spring 196 is secured at one end to the arm 195 and its other end to a part of a slide 220, on which the applying mechanism is mounted, in such manner as to draw the arm 195 towards the cam 194. The arm 195 passes through an opening 195ª through the slide 220. The member 197 is secured to a block 198 journaled between a pair of spaced brackets 219 mounted on slide 220. A pipe 199 constitutes a conduit from reservoir 213 for holding insulating compound or varnish, which reservoir is connected to pipe 199 as hereinafter described by a passage 199ª in the axis of rotation of the block 198. At the end of the member 197 adjacent to table 10 is a wick holder 200 having a horizontal passage 200ª therethrough continuing the passage 199. A vertical bearing 200ᵇ extends from the bottom of holder 200 to passage 200ª. In bearing 200ᵇ is located a combined pump and valve comprising a rod or plunger 201 movable vertically in the bearing 200ᵇ and supported in the block or support 200 by means of a link 201ª pivoted at its upper end 201ᵇ to the rod and at its lower end 201ᶜ to the slide 220. In order to allow a certain amount of play between plunger 201 and link 201ª, the pivot 201ᵇ comprises a pin and slot with a spring 201ᵈ connected at one end to slide 220 and engaging at its opposite end the pin on plunger 201 maintaining the pin 201ᵇ at the upper end of the slot. Secured in the block or jaw 200 is the wick 202 of suitable absorbent material such as felt with which communicates the varnish passages 199 and 200ª, the wick 202 being located at the outer upper portion of the jaw 200 and extending slightly above the upper surface of block 200. The spring 196 and link 201ª are secured to a block 220ª secured to the bottom of slide 220. An upper wick 203 of like material is likewise mounted upon the lower outer portion of a support 208 secured to a support arm 207. Wick 203 extends below the lower surface of block 208 and faces lower wick 202. A combined pump and valve member comprising a pin or plunger 204 is slidably mounted in a vertical passage or bearing 204ª in member 208. This plunger 204 is connected at its upper end by a link 205 pivoted at one end to the outer end of plunger 204 and at its opposite end to a bracket or a link support 206 secured to the vertical supporting plates 219. The upper end of link 205 has a pin and slot connection 205ª with member 206 and a spring 205ᵇ engaging the link holds the latter in one end of the slot to allow play. Like the lower plunger 201, the plunger 204 plays in a passage 208ª communicating with wick 203 and extending horizontally through member 208. Passage 208ª communicates by means of a conduit 209 with an axial passage 209ª, in turn communicating with reservoir 213, in block 210 which is pivoted between the brackets 219 above block 198 and supports member 207.

The tank 213 above the varnishing mechanism is supported by a pair of vertical rods 211 secured to the platform 228, as shown in Fig. 1, a band 212 surrounding the lower end of the tank securing the latter to the posts 211. A pipe 214 extends from the bottom of the tank through which the varnish or other insulating compound passes. A feed pipe 215 for the upper wick 203 communicates with pipe 214, while a feed pipe 216 for the lower wick 202 also communicates with the pipe 214 constituting branches thereof. These pipes 215 and 216 may be of any suitable material, preferably metal. A pair of flexible connections 218 connect the pipes 215 and 216 with the pivotal passageways 199ª and 209ª in the blocks 198 and 210. The flexible connections 218 are secured to the depending varnish feed pipes 215 and 216 by means of clamping devices 217. The whole compound applying mechanism, with the exception of the tank, is mounted upon a base slide 220 which is slidably mounted in the platform 228 (Figs. 1, 6, 7 and 8). This slide 220 is retained in position on platform 228 by means of a pair of base guides 225 secured to the platform 228 and extending beneath slide 220. The platform 228, as shown more clearly in Fig. 1, is provided with a recess or cut-away portion 228ª in which the base 220 can be slidably inserted and removed by means of the handle 220ᵇ after the disconnection of the flexible tubes 218 from the parts 216 and 215. A pair of meshing gears 226 are secured to the pivots or members 198 and 210, whereby upon rotation of the member 198, constituting the lower varnishing jaw, this rotation will be communicated through the gears to the upper jaw but in the reverse direction, whereby, upon the actuation of lever 195 by the cam 194, the jaws or wicks will move in opposite directions, one down and the other upwardly to allow the insertion of a sheet of mica, and towards each other to close upon the mica when spring 196 is released by cam 194.

In order to adjustably secure the slide 220 within its slideways 225, there is provided a locking and adjusting device more clearly shown in Figs. 6, 8 and 9 which comprises a rotatable lock adjustment nut 221 mounted in a slot 221ª in platform 228 and threaded on a lock adjustment screw 222, the screw being slidably mounted in an opening 222ª in the table 228 at the inner end of the slide 220. The screw 222 is prevented from rotating by means of a screw 222ᵇ fixed in the table 228 and riding in a longitudinal groove 222ᶜ in the screw 222. The screw 222 extends beyond platform 228 at the recessed portion, and when the slide 220 is in place enters a suitable hole 222ᵈ in the slide. The slide 220 is also provided with a transverse slot 223ª, in which is located a transverse base lock 223 pivoted in the slot 223ª at 223ᵇ and adapted to enter a transverse slot 223ᶜ in the end of the screw 222. The base lock 223 is normally held in engagement with the screw 222 in slot 223ᶜ by means of a spring 223ᵈ. The lower edge of lock 223 is beveled at 223ᶠ to allow easy entry of the lock 223 into the slot 223ᶜ when the slide 220 is inserted into position. If it is desired to remove the slide 220 from the platform 228 in order to clean the varnishing mechanism which is the prime purpose of the details of this assembled construction, all that is necessary is to depress the lever 223 by an application of the thumb to the thumbpiece 223ᵍ, whereby the lever 223 is lifted out of the slot 223ᶜ and thereafter the slide 220 can be removed. After the slide is in place and the lever 223 is in position within the slot 223ᶜ, the exact adjustment necessary for adjusting the position of the varnishing jaws for the best co-operation with the members 26 can be obtained by rotating the nut 221 one way or the other. It should be noted that the lever 223 is mounted upon the slide 220 and is removed therewith. In replacing the slide or base 220 and pushing it into position, the lower bevel surface of the lock 223 will allow the lock 223 to automatically lock the slide into position, the lock 223 being raised as it passes over the end of the screw 222 and dropping in place within the slot 223ᶜ thereafter. In order to hold the nut 221 in any position of adjustment, there is provided a spring 224 having detent 224ª thereon co-operating with depressions 224ᵇ arranged circumferentially around the nut.

In the position shown in Fig. 8, the varnishing jaws 202—203 are open so that, as any arm 25 rotates in the direction indicated by the arrows (Fig. 1) from the mica pick up position to the varnishing position and then moves radially outwardly, the mica carried thereby will be located between the open jaws or wicks and thereafter the jaws or wicks will close on the mica as shown in Fig. 6. While the varnishing jaws are closed, the arms 25 move radially inward toward their center, thus varnishing the mica by drawing it out from between the closed varnishing jaws and causing a bead of varnish to form on the end of the mica to be last removed (see Fig. 14ª). As the jaws 202—203 close, the plungers 201 and 204 will be relatively moved out of the passages 200ª and 208ª, and as the jaws open the plungers move relatively into these passages, not only cutting off the supply of varnish but forcing any varnish between plungers and the wicks into the wicks for subsequent application to the mica. The wick supports 200 and 208 with their wicks 202 and 203 are removable, whereby the varnishing jaws can be adapted for treating mica or other heets over varying widths or can be replaced for other reasons (see Fig. 8).

*Other details.*

To allow the crank shaft 22 to rotate with rotation of the table 10 without rotating the transmission mechanism for shaft 22 and without radially moving the arms 25, a pin 257 is secured to the shaft 22. This pin 257 rides on a ratchet surface (Fig. 3) 257ª on the upper end of collar 257ᵇ of gear 21, which is slidably mounted on shaft 22 and adapted to allow independent rotation of shaft 22 in one direction. Secured to the shaft 22 beneath the gear 21 is an abutment collar 245ª between which and the gear 21 and around the shaft 22 is interposed a coil spring 245 for maintaining the ratchet 257ª and gear 21 in upward position against pin 257. When the crank shaft 22 rotates with the table 10 in one direction moving the pin 257 to the left (shown in Fig. 3), the pin 257 merely slides along or over the ratchet 257ª and merely depresses the gear 21 without rotating it, allowing the meshing teeth of gears 20 and 21 to slide vertically relative to each other without injury. However, when gear 21 is rotated from gear 20, the vertical portion of ratchet 257ª engages pin 257 to rotate shaft 22. Secured to the shaft 22 above the rotatable table 10 is a disc 235, Fig. 3, provided with a ratchet groove 235ª on its lower surface terminating in a vertical abutment 235ᵇ. A vertical pin 236ᵇ slidably mounted in table 10 projects upwardly through the table and has an end riding in said groove 235ª. The pin 236ᵇ is yieldingly retained in upward position by a spring 236ª. As the table 10 rotates, it will cause the rotation of the crank shaft 22 therewith by reason of the engagement of pin 236ᵇ with the vertical abutment 235ᵇ. When the table 10 rotates, however, the rotation of the crank shaft 22 with it does not cause the rotation of the gear 21, for the reason abovementioned. When crank shaft 22 is rotated through gear 21, member 235 simply slips over pin 236ᵇ depressing the same without causing a rotation of table 10.

Referring to Figs. 1, 3, 4, and 5, there is provided upon the table 10 around the periphery thereof three spaced sets of spaced cams 239 and 240 corresponding to the number of arms 25. The front ends of each pair of cams are flared as shown at 240ª. Cams 239 and 240 form between them cam grooves 240ᵇ which are spaced inwardly from the edge of the table 10 at their rear ends more than at their front ends (see Fig. 1). As the table 10 rotates, say from position shown in Figs. 1 and 4, the roller 81 of the slide 80 is engaged between one pair of the cams 239 and 240 and rides in groove 240ᵇ between them. As the table completes a 120° rotation, the slide 80 is moved axially inward toward the center of the table, raising the vacuum cup support 73 into mica-taking position as shown in Fig. 5 and actuating the vacuum valve mechanism. Slide 80 is then in position to be actuated by any arm 25 in the reverse direction. In like manner, each succeeding pair of cams 239 and 240 engages the roller 81. The return movement of the slide 80 to reverse the movement of the vacuum cup and valve mechanism is obtained by movement of the several arms 25 to mica-taking position as previously described. The vacuum valve mechanism and vacuum cup are alternately actuated by a rotation of the table 10 moving them in one direction and by the outward movement of the arms 25 moving them in the reverse direction.

Referring to Figs. 2, 19 and 20, there is provided upon the platform 241 resetting contacts 242 and 243 controlling the motor circuit, mounted upon springs 242ª which tend to separate them and held closed by reason of the engagement therewith of a finger 243ª fixed to lever 87 as shown in Fig. 2. When lever 87 is pulled rearwardly, as shown in Fig. 19, to reset the counting mechanism, the contacts 242 and 243 are opened, whereby the machine does not start to operate until after the resetting mechanism is operated and released.

*Electrical controlling apparatus and circuits.*

In addition to the magnetic lock shown in Fig. 3 and above described, there is also provided, as shown more clearly in Figs. 2, 10, 11 and diagrammatically in Fig. 20 a motor controlling switch 254. This switch comprises an electric magnetic coil 254ª, and an armature plunger 254ᵇ sliding through the coil 254ª. A knife contact 254ᶜ is pivoted at one end to the base of the control 254 and is pivoted intermediate its ends to one end of plunger 254ᵇ. The opposite end of contract blade 254ᶜ is adapted to alternately engage the spaced contacts 254ᵈ and 254ᶠ. The plunger 254ᵇ is moved in one direction through the energizing of the coil 254ª and is moved in the opposite direction (to engage contact 254ᶠ) by means of a spring 254ᵍ. The contacts 254ᵈ and 254ᶠ are connected in the circuits of the machine as hereinafter described. There is also provided suitable means for stopping the machine should the foil 179 break. For this purpose, there is illustrated in Figs. 2, 11 and 20 a foil relay 255, which is actuated should the foil 179 break. Relay 255 comprises coils 260 and cores 261. The coils 260 are shown in Fig. 20 in circuit with an electrical battery 262, drum 180 and foil 179 to ground. Should the foil break, the electromagnet or relay 255 will be de-energized allowing the spring 263 controlling the armature contact 264 to close a circuit to actuate the contacts or switches controlling the motor, braking and locking mechanism in the manner hereinafter described.

In Fig. 20 is illustrated diagrammatically the electrical wiring of the machine above described. In this view, a resistance 265, contacts 242 and 243, the electromagnetic winding 254ᵃ of the switch 254, and the electromagnetic winding 64ᵃ of the lock 64 are connected in series across the line. In like manner, the rheostat 266 and motor field 267 of relatively large resistance are connected in series across the line in parallel with the circuit of contacts 242 and 243 and coils 254ᵃ and 64ᵃ. Armature 268 through the movable blade 254ᶜ and contact 254ᵈ of motor switch control 254 is inserted across the line in parallel with the field 267 and first circuit. A resistance 269, connected at one end to one end of the armature 268, is adapted to be connected to the opposite end of armature 268 when the blade 254ᶜ of the electromagnetic switch 254 is moved to the position shown in dotted lines engaging contact 254ᵇ, this resistance 269 constituting an electric brake for retarding the final movements of the armature 268 when the latter is de-energized by the movement of blade 254ᶜ. The movable contacts 44 and 45 are in a circuit shortcircuiting the coils 254ᵃ and 64ᵃ. When the counting mechanism has operated a predetermined number of times, the contacts 44 and 45 close, short-circuiting the winding of the electromagnetic switch 254 and lock 64, releasing plungers 254ᵇ and 64ᵇ, throwing in resistance 269 to brake the armature and locking the machine. The relay 255 controls a shortcircuiting conductor including armature 264 connected to the line which likewise shortcircuits the coils 254ᵃ and 64ᵃ. Should the foil 179 break during operation, the circuit including the foil is broken, allowing the closing of circuit including armature 264 in like manner controlling switch 254 and lock 64 to stop the motor and machine. After the machine stops, the foil can be repaired.

If it is desired to start the machine after the contacts 44 and 45 close, all that is required is the actuation of the resetting mechanism by means of the handle 98. During this operation, the contacts 44 and 45 are separated, the contacts 242 and 243 being open, however, to prevent the starting of the machine. When the handle 98 is released, contacts 242 and 243 close, energizing coils 254ᵃ and 64ᵃ moving their plungers against the tension of their springs, releasing the lock 64 and starting the motor. The resistance 265 should be of an order to allow the release or operation of switch 254 and lock 64 to stop the machine when the contacts 44 and 45 close to short-circuit the circuit in which the switch and lock are located.

Operation.

Let it be assumed that the machine has just ceased operation and the contacts 44 and 45 are together. If the operator now desires to start the machine, he pulls the handle 98 rearwardly as far as possible and, thereby disconnecting the contacts 44 and 45, by means of the racks 59 and 60, thereby setting the machine for a definite number of operations; that is, to build a stack of a definite number of micas and foil sheets. The exact number of operations before the machine again stops depends on the relative positions of the two racks when actuated and as previously described. As the operator pulls back the lever 98, the contacts 242 and 243 open, and, even though the contacts 44 and 45 are then separated, the machine will not begin to operate until the lever 98 is released and the contacts 242 and 243 close upon its return. Assume that the machine has started and moved the arms 25 radially to the position shown in Fig. 1, the table 10 being stationary, and from the position shown in Fig. 1, the arms 25 are about to move inwardly towards their center by means of the crank shaft 22. The arm 25, shown in the position in the vicinity of the mica hopper, will move inwardly, carrying with it a piece of mica, and the arms 25 in the vicinity of the varnishing device will pull out a piece of mica from between the varnishing jaws carrying with it a varnished sheet of mica. In the removal of the varnished mica from the varnishing jaws, the edge of the mica which last leaves the varnishing jaws will have thereon a bead of extra-thick varnish deposited on the edge of the mica as it disengages the jaws. The arm 25 in the vicinity of the stacking and foil laying mechanism has just deposited its sheet of mica on the stack building support. The outward and inward movement of the arms 25 is accomplished from the driving mechanism or motor through the Geneva gear mechanism 16. The star wheel 16 is operated intermittently, and alternately with star wheel 6, to impart a complete outward and inward movement to arms 25. During this operation, the star wheel 6 remains stationary holding the table 10 against rotation. As the arms 25 move inwardly, the plunger mechanism is operated to lay the foil as above described. The details of this foil-laying operation have been described, wherein the cams 119 depress the male die 125 into the female die (124), cutting out a tinfoil blank. After the movement of the die 125 ceases through the stops 249, the inner member 123 becomes disengaged from the die support 121 and moves downwardly to place the foil on top of the stack upon the yielding support 145 depressing it slightly to maintain the upper level of the stack constant. When member 123 reaches its lowest position, a blast of air is forced through the central member and escaping outwardly in all directions over the foil causes the latter to be laid flat against the varnished mica. After this operation has been performed, the parts 121 and 123 are returned to the position shown in Fig. 13 ready for the next succeeding operation. After the last-above described operation has taken place and the arms 25 have been moved inwardly towards their center to final position, the star wheel 16 controlling the arms is locked as described above and the star wheel 6 is then released. The star wheel 6 controls the transmission which rotates the table, stack building stand, and feeds the foil strip. As the arms 25 reach their innermost positions ready to be rotated with the table 10, the varnishing jaws 202—203 meanwhile have opened to receive a new sheet of mica or other material to be varnished. This intermittent opening and closing of the varnish jaws 202—203 is obtained by means of the rotation of the cam 194 engaging the arm 195. The table 10 and shaft 22 now rotate 120° in direction of arrows Fig. 1 carrying with them arms 25. The rotation of shaft 22 is allowed by means of the pin and ratchet cam connection with the slidable gear 21, as previously described. This movement carries the varnished mica to position to be deposited upon the stack, carries a piece of mica from the mica hopper to position to be varnished, and carries an arm 25 to a position to pick up another piece of mica from the mica hopper. The rotation of the table also causes the roller 81 to engage the groove between the two cam surfaces 239 and 240 upon the rotatable table, moving the slide 80 radially toward the center of the table, which movement raises the vacuum cup to engage a piece of mica, and applies a vacuum thereto. During the rotation of the table 10, the building stand is rotated 180°, so that the foil sheets, which may be of the shape illustrated in Fig. 1 as indicated by the cut out portions, may have their tabs project alternately from opposite ends and the rotation of the table also places the beads upon successive micas alternately at opposite ends of the stack as shown in Fig. 14ª and thereby in the building of the stack causes a uniform distribution of varnish, inasmuch as by this method of building the end of each mica which was grasped by the jaws 26, and hence unvarnished, would lie adjacent a bead of varnish on an adjacent mica sheet, thus becoming covered with varnish. By alternating an unvarnished jaw-engaged portion of mica with a varnished beaded portion of mica, uniform distribution is obtained. During the rotation of the table, the foil is fed forward one step by the mechanism above described. After the table 10 has completed its movement through 120°, it stops. The arms 25 thereafter move outwardly from their innermost position to outermost position. In regard to the mica pick-up operation, the outward movement of the arm 25 causes an outward movement of the slide 80, which movement lowers the vacuum cup, bending a piece of mica around the supporting ledge 72 as an axis, while the ledge 69 prevents more than one mica from being drawn out. As any member 26 passes under the trip 67, the jaws are opened and thereafter allowed to snap over the edge of the mica as shown in Fig. 5. As to the varnishing mechanism, the member 26 with its piece of mica is placed in position between the open varnishing jaws which thereafter close. In regard to the arm facing the stack building and punching mechanism, as this arm moves outwardly, the upward projecting finger 26ᵍ on the member 26 is engaged by the adjustable finger 146 and opened. Thereafter the ledge 26ᵉ on the lower fixed jaw pushes the mica into position as shown in Figs. 17 and 18 and where it is retained between the springs against being pulled out as the jaws again move inwardly toward the center.

After the machine has completed the required number of operations as predetermined by the counting mechanism, the contacts 44 and 45 come together stopping the machine. The punch mechanism starts to lay a piece of foil at or near the end of the outward movement of the arm 25 or slightly after the arm 25 begins to move towards its center. The time allowed for the plunger or punch action, both down and up, is the interval between the time required for the arm 25 to reach the outer end of its travel and to fully return. The plunger or punch must be free of the stack building stand before the table 10 rotates, as the latter is geared to the stand upon which the stack is built. The rotation of table 10 120° rotates the stand on which the stack is built 180°. This is accomplished by the transmissions herein described. The Veeder counter 90 counts the number of condensers that are made and is actuated by the reset mechanism. After a stack of the required size is built, the platform 139 with rods 140 and stack may be removed, a spring plate and clamp placed around the stack, and the whole baked.

In the varnishing mechanism, only very simple mechanisms are used, as there is a great tendency toward clogging and sticking. In cases where a fluid or molten wax is used which is solid at ordinary temperature, insulating material-applying mechanism should be hooded and provided with heating means. The building platform or stand should be likewise hooded and heated.

The advantages of a machine of the character described are that by such a machine a more perfect and less costly condenser can be produced, and the condensers are of a uniform character. Accurate laying of alternate conducting and mica elements is also obtained as well as uniformity in varnishing. The cost is reduced by speedy mechanical operation and by combining several of the condenser building steps which, if done manually, involve a large amount of labor in performing. For instance, in running the machine at slow cycle speed of one cycle per second, the labor saving is approximately ninety per cent. Furthermore, the waste factor of the condenser building is largely cut down. For example, in present processes, mica is first varnished; and then the mica film built into the condenser stack manually. Separation of the mica films after they have been varnished causes a large quantity to be broken. This breakage does not occur where the machine is used. Loss in condensers due to the building of condensers with two foil elements together instead of a single foil element is eliminated. In the hand process, condensers of this type split after baking, and require re-processing to repair them. The fault of omitting the mica element between two conducting elements does not occur in this machine.

*Supplemental mica pick-up mechanism.*

The pick-up mechanism shown in Fig. 5 is adapted for picking up sheets of mica of substantial uniform length, or at the most mica which has a tolerance or variation in length of 1/64 of an inch. In cases where the mechanism of Fig. 5 is operating, it is preferable that the forward edge of each sheet of mica be in alinement with the vertical part 69, so that each forward edge when the micas are lowered to the position shown in Fig. 5 is at substantially the same point to be gripped by members 26. In such cases as have been described, when a member 26 pulls out the bottom sheet of mica to transfer to the varnishing mechanism, the lower sheet of mica in being pulled out, by reason of its frictional contact with the sheet immediately above it, tends to move this sheet forward against the stop 69 as shown, thereby alining it. Where the variations in lengths of mica, however, are greater than 1/64 of an inch or even to ensure better and more perfect operation of the mica pick-up, there may be provided in the mechanism shown in Fig. 5 a device to assure perfect functioning of the pick-up mechanism, and for this purpose I have illustrated such a device in Figs. 21-24 inclusive, which may supplement the construction previously described if so desired. In these figures, there is journaled in and between the vertical plates 66 a roller 275 having slightly frictional properties, of a material such as rubber. This roller is located immediately in front of the inclined platform or support 72 for the mica stack, and with its upper edge slightly above the level of the upper surface of 72. The mica stack 70 rests in part upon the support 72 and in part upon the roller 275. This roller at one end thereof adjacent one of the plates 66 is provided with a gear 276. The vacuum cup support 73 is pivoted on supports 74 substantially in line with the axis of the roller 275 as in the construction already described. Journaled in an upright 66 below the gear 276 is a shaft 277 having a gear 278 thereon meshing with gear 276 on one side of the plate 66 and having a ratchet wheel 279 secured thereto upon the opposite or outer side of the plate 66. One of the pivot arms 280 of the vacuum cup support 73 extends rearwardly as shown, and pivoted to this rearwardly-extending arm 280 of the vacuum cup support is a pawl 281 which is arranged to engage the ratchet 279 and is held yieldingly in contact therewith by means of a spring 282 secured at one end to the pawl 281 and at the other end to a vertical bracket 74. There is illustrated slightly modified means for operating the vacuum cup and its support 73, and for this purpose to the support 73 is secured a downwardly depending arm 283 having a hole 284 therein; while to the rear end of slide 80 is secured pin 285 having a pair of spaced heads 286 thereon. The pin 285 extends slidably through the hole 284 with the arm 283 interposed between the two heads 286; a spring 287 being interposed between the arm 283 and the end head of the pin. As the slide 80 is moved back and forth by the mechanism already described, the vacuum cup support 73 with its cup is raised and lowered. In the position shown in Fig. 21, the cup is in raised position against the lowermost mica sheet. The spring 287 is for the purpose of making the engagement of the cup support 73 with the mica stack yielding to prevent displacement of the mica sheets relative to each other. As the vacuum cup support 73 is raised from the lowermost position to the position shown in Fig. 21, the pawl 281 will be moved downwardly rotating the ratchet wheel 279 in a counter clock wise direction locking at Fig. 24, and thus rotating the gears to cause a rotation of the rubber roller in such direction as to move the lowermost sheet of mica up against the part 69. As the vacuum cup is again lowered, the mica is bent, as shown in broken line in Fig. 21, around the roller as an axis and to a position whereby it may be properly engaged by the several members 26 and removed. The lowering of the cup support 73 causes an upward movement of the ratchet. This movement, however, is in such direction that the pawl merely clicks over the ratchet. When the roller has rotated sufficiently upon raising of cup support 73 to move the lowermost sheet of mica up against the edge 69, the friction thereafter is of such value that the roller slides against the mica sheet without providing sufficient force to buckle the mica. On the downward movement of the vacuum cup, the roller remains stationary. Again, as previously stated, the removal of the mica sheet by any member 26 causes the next sheet in engagement therewith to move forward towards the alining member 69. This may or may not be sufficient to completely aline the sheet in question. However, upon the next operation of the alining roller, the sheet will be properly alined by abutting alining member 69.

It is to be understood that the invention is not limited to the embodiments and features specifically shown and described herein, but that such embodiments and features are subject to changes and modifications without any departure from the spirit of the invention.

I claim:—

1. A machine for building mica sheet condenser stacks comprising a pickup mechanism for mica sheets, insulating material applying mechanism, a foil punching and laying mechanism and carrying means for carrying mica sheets to be treated from the pickup mechanism to the other mechanisms comprising a movable table and arms movable with and relative to said table towards and from said several mechanisms to take up the sheets and present them for treatment and means for moving said arms relative to the table to pick up mica sheets and present them for treatment and moving said table with said arms to the several mechanisms alternately.

2. A machine for building mica sheet condenser stacks comprising a mica magazine for holding sheets to be treated, a plurality of treating mechanisms including insulation-applying mechanism and foil-punching and laying mechanism, a rotatable table, gripping devices mounted on said table and movable relative thereto towards and away from said several mechanisms, and rotatable with said table to successive positions before said treating mechanisms, and means for actuating said mechanisms, table and gripping devices whereby the gripping devices are moved towards and away from the several mechanisms and rotated with the table alternately.

3. A machine for building mica sheet condenser stacks comprising a plurality of operating mechanisms spaced from each other, a movable table, mica sheet gripping devices mounted on said table and movable relative thereto and also therewith, and means for intermittently and alternately moving said devices relative to said table and said table with said devices whereby the devices are moved towards and away from the operating positions and by the movement of said table from one operating position to the other.

4. A machine for building mica sheet condenser stacks comprising a mica sheet magazine, an insulating material-applying mechanism, a stack building stand, a foil-laying mechanism associated above said building stand, a movable table arranged in the vicinity of said mechanisms, gripping devices movable on said table relative thereto and therewith, said gripping devices being adapted to move towards and away from the magazine to grip a mica sheet to be treated, and transmission mechanism for operating the several mechanisms, said transmission mechanism comprising intermittent movements for moving the gripping devices towards and away from the several mechanisms and for alternately moving said table with said gripping devices from one operative position to the other.

5. In a machine of the character described, a sheet magazine having a device associated therewith to make the sheets therein successively available to be carried from one point to another, an insulating material applying mechanism, a building stand, foil-laying mechanism, and means for carrying said sheets from the magazine successively to the several operating mechanisms and the building stand, said carrying means comprising a rotatable table and gripping devices slidably mounted on said table and movable towards and away from the magazine, the insulating material applying mechanism and the building stand, and means for alternately moving said devices to grip a sheet, apply the material to a sheet and deposit a sheet on the building stand and for rotating said table for carrying said gripping devices from the sheet pickup position to the applying position, from the applying position to the laying position, and from the laying position back to the pickup position, means for actuating said foil-laying mechanism, and means associated with the means for moving said gripping devices for imparting relative movement to said foil-laying mechanism and building stand.

6. In a machine of the character described, a sheet magazine, a building stand, a foil-laying mechanism associated with said building stand, means for carrying a sheet from said magazine to the building stand, said means comprising gripping devices for withdrawing the sheet from the magazine and movable towards and away from the building stand to deposit the sheet therein, said gripping devices being mounted to move from the sheet pickup position to the building stand position, and means for actuating the several mechanisms comprising intermittent movements whereby the gripping devices are moved inwardly and outwardly and then swung from one position to the other, and including means for actuating the foil-laying mechanism and means for imparting relative movement to the foil-laying mechanism and building stand while the gripping devices are moving from the pickup position to the foil-laying position and from the foil laying position to the pickup position.

7. In a machine of the character described, a magazine having associated therewith a device for making the sheets in the magazine available to be picked up, insulating material-applying mechanism, a building stand, foil punching and laying mechanism over said building stand, a rotatable table, gripping devices slidably mounted on said table towards and away from the several mechanisms, the number of gripping devices corresponding with the number of mechanisms, feeding devices associated with said foil-laying and punch mechanism for feeding a strip of foil to the foil-laying mechanism, and transmission mechanism for actuating said foil-laying mechanism, for moving intermittently said gripping devices inwardly and outwardly towards and away from the several mechanisms for picking up sheets, applying the material to the same and laying the same in the building stack and alternately therewith rotating said table, actuating said feeding device and rotating said building stand.

8. In a machine of the character described, a magazine for a stack of superimposed sheets, the said magazine comprising a semi-base upon which the bottom of the stack rests and a vertically-arranged abutment engaging the forward edges of the sheets, a vacuum cup movable upwardly and downwardly to and away from the bottom sheet whereby the bottom sheet is pulled down by suction to removing position, a valve controlling the admission of air and vacuum to said cup, a slide movable in opposite directions to raise and lower the vacuum cup and actuate said valve, a gripping device comprising a pair of relatively movable jaws movable inwardly and outwardly, means for opening said jaws as they reach position to grip the lowered sheet, means whereby said slide is actuated to lower the vacuum cup through the movement of said gripping device, and means for actuating the slide in the reverse direction to cause the cup to engage the next sheet and operate the valve to cause suction.

9. In a machine of the character described, a sheet magazine comprising a semi base slightly inclined upon which a stack of sheets is adapted to rest with the portions thereof exposed at the bottom and comprising a back and sides for supporting the sheets, said magazine being opened at its forward end and flared outwardly, a vertically-arranged abutment adapted to engage the forward edges of the sheets, the lower edge of said abutment being substantially in the plane of the upper surface of the semi support, a vacuum cup pivoted below said stack upon an axis substantially in line with the upper forward edge of said inclined semi support, a valve for controlling the admission of air and vacuum to said cup, a slide movable in opposite directions to raise and lower said cup and actuate said valve, a gripping device movable towards and away from said magazine to grip the lowered sheet, said gripping device comprising a pair of relatively movable jaws spring pressed towards each other, a trip mounted upon the frame of the magazine adapted to open said jaws as the gripping device moves toward the magazine and allow the jaws to close over the lowered sheet, said trip being yieldingly and pivotally mounted to allow the withdrawal of the gripping jaws, said slide being actuated to lower the vacuum cup by means of said movable gripping device and means for actuating the slide in the opposite direction after the gripping device has been withdrawn.

10. A machine for building mica sheet condenser stacks, comprising a mica magazine for holding a stack of mica sheets in superimposed position and including a semi base upon which a portion of the stack rests, a vertically-arranged abutment engaging the forward portions of lowermost sheets, means for moving said mica sheets to pick up position, bending them around the semi base, and a gripping device for pulling out and removing said lowered sheet, said abutment performing the dual function of alining the edges of the sheets and preventing the withdrawal of more than one sheet.

11. In a machine of the character described, a magazine for holding a stack of sheets in superimposed position and including a semi base upon which the sheets rest, a vacuum cup movable upwardly into engagement with the bottom sheet and mounted below said semi support, a valve controlling the admission of air and vacuum to said vacuum cup, a slide operatively connected to said vacuum cup and valve and mechanism for removing a lowered sheet from said magazine and moving it to an operating position, including a rotatable table and a gripping device slidably mounted on said table and also rotatable therewith, said gripping device actuating said slide in one direction to control the movement of said vacuum cup and valve and spaced cam members circumferentially arranged on said table and engaging said slide for moving the same in the opposite directions upon the rotation of the table, and means for alternately moving said gripping device relative to said table and rotating said table with the gripping device.

12. In a machine of the character described, a magazine adapted to contain a stack of superimposed sheets and including a semi base upon which a portion of the lower end of the stack rests, said base being slightly inclined, a vertically-arranged abutment engaging the inner edges of the lowermost sheets of the stack, a vacuum cup mounted below said stack and movable upwardly and downwardly towards and away from the stack for suctionally engaging a sheet and lowering the same, a valve controlling the admission of air and suction to said cup, a slide operatively connected to said cup and said valve for controlling the operation thereof, a gripping device mounted above said slide and engageable therewith to move the same in one direction to operate said cup and valve, said gripping device comprising a pair of relatively movable jaws for engaging the lowered sheet, a trip mounted in the path of movement of said jaws for opening the same to grip a sheet and mounted to allow the withdrawal of the jaws and gripping device, spring-pressed detents for holding the slide in its alternate positions, a rotatable table upon which said gripping device is mounted and having a pair of spaced cam members arranged to move the slide in the opposite direction as the table rotates, and means for alternately actuating said gripping device to engage a sheet and withdraw the same and rotating said table with the gripping device to an operating position.

13. In a machine of the character described, a carrying mechanism comprising a rotatable table and a gripping device movable inwardly and outwardly relative to said table, an insulating material applying mechanism comprising a pair of relatively movable jaws having wicks for absorbing insulating material and arranged adjacent to said table, means for intermittently opening and closing said jaws, and mechanism for rotating said table to bring said gripping device to position in front of said insulating material applying jaws, and moving said gripping device outwardly to place a sheet between the jaws when open and in the opposite direction to withdraw a sheet from between said jaws when closed whereby the sheet is coated with insulating material.

14. In a machine of the character described, a frame, a pair of pivoted jaws for applying insulation mounted upon the frame and provided with co-operative meshing gears upon their axes, an arm attached to one of said jaws, said arm being spring-pressed to bring the jaws together to insulation-applying position, a cam for actuating said arm in the opposite direction, a reservoir, conduits connecting said reservoir to said jaws, said jaws being provided with vertical passages communicating with said conduits, and plungers slidably mounted in said vertical passages, controlling the flow of insulation through said conduits, also constituting pumps for forcing the insulation into the jaws, and having linked connections with the frame and movable relative to said jaws.

15. In a machine of the character described, a frame, a rotatable table mounted in said frame and having thereon relatively movable sheet-carrying devices, a slide mounted on the frame at one side of said rotatable table and movable inwardly and outwardly towards and away from said table, insulation-applying mechanism on the slide and means for securing said slide to the frame and adjusting the same towards and away from said table whereby said mechanism is adjusted to co-operate correctly with the sheet-carrying devices, and comprising a longitudinally movable non-rotating bolt mounted in alined openings in the frame and slide, a nut mounted upon said frame and threaded on said bolt whereby the bolt may be adjusted longitudinally, a spring-pressed latch pivoted upon said slide and provided with a beveled lower edge adapted to enter a transverse slot in the opposite end of said bolt for locking the slide whereby the slide is detachably secured to the bolt and may be adjusted by the operation of the nut.

16. In a machine for building mica sheet condenser stacks, the foil-preparing mechanism which comprises a pair of relatively movable co-acting die members, a plunger movable through said die members to eject material therefrom, and a stack building stand mounted below said dies and plunger for receiving said material.

17. In a machine of the character described, a pair of relatively movable die members, a plunger movable through said die members for ejecting material therefrom, means for actuating said die members relative to each other and said plunger relative to said die members, and a building stand located below said members and plunger and provided with a base arranged to be depressed by said plunger upon deposition of material thereon by the plunger.

18. In a machine of the character described, a frame, a die member secured to said frame, a second die member movably mounted with relation to the first die member and adapted to co-operate therewith, a plunger associated with said die, a building stand below said plunger, and means associated with said plunger for forcing a fluid over the material punched out by the dies as it is laid upon the building stand.

19. In a machine of the character described, a frame, a die member secured to said frame, a building stand located below said die member, a die support slidably mounted above said first die member and comprising a co-operating die member secured thereto and adapted to fit into the first die member, a plunger mounted in said die support and movable relative thereto and having a resisting engagement therewith, means for limiting the downward movement of the die support relatively to the first-mentioned die, and means for actuating said die support and plunger, said means allowing the movement of the plunger after the movement of the die has ceased whereby the material acted upon by the dies is deposited thereafter by the plunger upon the building stand.

20. In a machine of the character described, a frame, a die secured in said frame, a building stand mounted below said die, a support mounted above said first-mentioned die member and slidably mounted upon said frame and guided thereon, a die member upon said support co-operating with said first die member, a plunger slidably mounted through said support, frictional means whereby said plunger is fixed relative to said support, means connected to said plunger for actuating the same and therewith said die support and means for limiting the downward movement of said die support whereby said plunger actuating means causes relative movement between the said plunger and said die support whereby the material acted upon by the dies is deposited upon the stand thereafter by the plunger.

21. In a machine of the character described, a frame, a die secured in said frame, a building stand mounted below said die, a support slidably mounted upon said frame and guided thereon to aline the dies, a die upon said support, means for limiting the movement of said dies relative to each other, a pair of spaced brackets mounted upon opposite sides of said movable support, a shaft journaled in said brackets, a pair of cam wheels having cam grooves in their adjacent faces and mounted upon said shaft at opposite sides of said die support, a plunger slidably mounted through said die support and provided with means engaging said cam grooves whereby said plunger is reciprocated by the movement of said cam wheels, yielding means whereby said plunger yieldingly engages said die support whereby upon the initial movement of the plunger the die support is actuated thereby, said yielding means being arranged to allow the subsequent movement of the plunger downwardly relative to the die support to eject material punched by the dies.

22. In a machine of the character described, a pair of relatively movable dies, a plunger movable through said dies, a building stand mounted below said dies and plunger and provided with a depressible base upon which the material treated is deposited, and compressed air means associated with said plunger for spreading out the material acted upon by said dies as the plunger moves the same to the stand, said plunger engaging said base for depressing the same as the stack is built.

23. In a machine of the character described, a base support, a die member mounted in said support, means for intermittently feeding over said support and over said die member a strip of material, a building stand mounted below said base support and die member and provided with a resistantly yielding stack base, a die support slidably mounted upon said base support above said first-mentioned die member and provided with a die member co-operating with the first die member and alined therewith, a plunger slidably mounted relatively to said die support and die member thereon, spring pressed means arranged in said plunger and engaging opposite walls of the die support for holding said plunger in raised position above the lower end of the second die member, cam mechanism connected to said plunger for actuating the same and with it the die support for dieing out a sheet from said strip, means for limiting the downward movement of said die support, and a longitudinal passage through said plunger communicating with a source of compressed air when said plunger is in its lowered position whereby, after the material has been punched and the plunger has reached its lowest position to deposit said material upon the building stand, compressed air will be forced from the end of the plunger spreading out the material acted upon.

24. In a machine of the character described, a base support, a die secured in said support, a movable die support mounted above that base support and having a die co-operating with the first die, a pair of vertical guiding posts mounted upon said base support and sleeves secured to said movable die support for guiding the latter on the posts, and a plunger movably mounted within said movable die support and having means for ejecting compressed air therefrom, said compressed air means comprising a passage located in part upon said movable support and in part upon a vertical post.

25. In a machine of the character described, a base support, a female die located in said support, means for intermittently feeding foil strip over said female die, a stripper located above said foil strip above said die, a die support slidably mounted upon said base support and having a male member co-operating with said female die for punching the foil strip, a building stand located below said female die and provided with a yielding base upon which a stack is built, mechanism for delivering to said building stand sheets of dielectric and actuating said dieing mechanism, and a plunger associated with said dieing mechanism for depositing the punched foil sheets upon the dielectric, and comprising means for forcing a fluid upon said stack as it is being built.

26. In a machine of the character described, a building stand, a dieing mechanism associated with said building stand, means for intermittently feeding a foil strip through said dieing mechanism, a plunger for depositing said foil sheets as they are punched upon the building stand, mechanism for depositing sheets of dielectric upon said building stand alternately with the foil sheets, and means for intermittently rotating said building stand relative to said dieing mechanism, whereby a condenser stack comprising alternate sheets of foil and dielectric is built.

27. In a machine of the character described, a building stand upon which dielectric sheets may be deposited, a pair of co-operating dies above said building stand, means for intermittently feeding foil strip between said dies when separated, a plunger associated with said dies for depositing punched foil sheets upon the stand, and means for rotating said building stand relative to said dies whereby the sheets of foil project alternately forming terminals.

28. In a machine of the character described, a pair of relatively movable dies, a plunger movable relative to said dies, an intermittently rotatable building stand mounted below said plunger, means for feeding foil strip between said dies, and actuating means for said moving parts, said building stand and feeding means being operated when the dies are in separated position.

29. In a machine of the character described, dieing and plunger mechanism, a feeding device for feeding foil strip through said dieing mechanism, a rotatable building stand mounted below said dieing mechanism and plunger, dielectric-carrying devices movable to position to deposit dielectric in said building stand between successive operations of said dieing mechanism, and means for actuating said carrying devices, building stand, feeding device and dieing and plunger mechanism.

30. In a machine of the character described, dieing mechanism for punching and depositing sheets of metal, a building stand mounted below said dieing mechanism for receiving said sheets, carrying arms for carrying sheets of dielectric to said building stand, and means for releasing said sheets when the carrying arms are in position over said building stand to deposit the sheets of dielectric.

31. In a machine of the character described, a pair of relatively movable dies, means for feeding strip of foil between said dies, a rotatable building stand mounted below said dies, a plunger associated with said dies for depositing foil upon said building stand, a rotatable table, a magazine for holding sheets of dielectric, means slidably mounted upon said table and movable to position in front of said magazine to pick up a sheet of dielectric and to position in front of said building stand to deposit a sheet therein, mechanism for moving said pickup means relatively to said table outwardly and inwardly, towards and away from the magazine and building stand, mechanism for alternately rotating said table carrying with it said pickup means to and from the building stand position, and means for releasing said sheets of dielectric into the building stand.

32. In a machine of the character described, a dieing and plunger mechanism comprising a pair of relatively movable dies with means for actuating the same and a plunger movable relative to said dies, foil feeding mechanism for intermittently feeding a strip of foil between said dies, a rotatable building stand mounted below said dieing and plunger mechanism and provided with a yielding base upon which a stack is built and adapted to be depressed by said plunger, said plunger being provided with means for forcing, when in its lowered position, a fluid over the stack, a magazine for holding sheets of dielectric, a mechanism for removing said sheets from said magazine and carrying them to the building stand comprising a rotatable table and pickup arms slidably mounted upon said table and movable outwardly and inwardly, to and from the pickup and depositing positions upon the building stand, said arms comprising spring pressed jaws for gripping the sheets of dielectric, mechanism for alternately moving said arms in and out and rotating said table with said arms, mechanism driven by the table rotating mechanism for intermittently feeding said foil strip and rotating said building stand, and means for releasing said sheets into the building stand when the arms move outwardly to sheet-depositing position.

33. In a machine of the character described, dieing and plunger mechanism, foil strip feeding mechanism associated with said plunger and dieing mechanism, a rotatable building stand mounted below said foil dieing and plunger mechanism, a magazine for sheets of dielectric, an insulation-applying mechanism comprising a pair of relatively movable jaws adapted to close over a sheet of dielectric and apply insulation to the sheet when withdrawn, carrying mechanism for carrying dielectric from said magazine to said insulation-applying mechanism and then to said building stand, said mechanism comprising a rotatable table, pickup arms slidably mounted upon said table and adapted to move outwardly and inwardly towards and from said magazine, applying mechanism and building stand, means for alternately moving said arms outwardly and inwardly and rotating said table to bring the arms to different positions, means for releasing a sheet of dielectric from the pickup arms into the building stand as the arms move outwardly to position in front thereof and mechanism operatively connected to said table-rotating mechanism for rotating the building stand 180° between successive actuations of the dieing and plunging mechanism whereby the punched foil sheets are deposited in the building stand at opposite ends of the stack alternately.

34. In a machine of the character described, relatively movable dies co-acting with each other, a drum, a foil strip wound on said drum, means for feeding said strip between said dies to be punched, a source of electrical energy associated with said foil whereby the latter forms part of an electric circuit, and means actuated upon the breaking of said circuit by the breaking of the foil for stopping the operation of the dieing members.

35. In a machine of the character described, a plurality of mechanisms and means for carrying material from one mechanism to the other comprising a rotatable table, a plurality of pickup arms slidably mounted on said table, a crank shaft extending through said table and connected with said arms, and transmission mechanism for imparting intermittent movement alternately to said table and said arms and comprising means allowing the rotation of said shaft with said table without actuating the arms relative to the table.

36. In a machine of the character described, a plurality of mechanisms and means for carrying material from one mechanism to the other comprising a rotatable table, a plurality of pickup arms slidably mounted upon said table, a crank shaft extending through said table and connected to said arms for actuating the same relative to the table, transmission mechanism for intermittently operating said table, transmission mechanism for intermittently rotating said crank shaft alternately with said table to actuate said sliding pickup arms, said last-mentioned mechanism comprising a gear upon said crank shaft mounted to yield axially of the shaft as the shaft rotates in one direction upon the rotation of the table and to rotate the shaft when actuated by its transmission mechanism.

37. In a machine of the character described, a plurality of mechanisms and means for moving material to be treated from one mechanism to the other, said means comprising a rotatable table, slidable pickup arms mounted on said table, a crank shaft extending through said table and operatively connected to said arms for actuating the same, means for causing said shaft to rotate with the table and to allow the rotation of said shaft without the table, transmission mechanism for rotating said table and transmission mechanism for rotating said crank shaft alternately with the table, said last-mentioned mechanism comprising a gear slidably mounted upon said crank shaft, a pin secured to said crank shaft and engaging a ratchet upon said gear and a spring for forcing the gear against said pin whereby upon the rotation of the crank shaft with the table said slidable gear moves vertically without imparting movement to its transmission mechanism.

38. In a machine of the character described, a plurality of mechanisms, means for conveying material to be treated from one mechanism to the other and comprising a rotatable table, pickup arms slidably mounted on said table, a crank shaft extending through said table and connected to said arms, Geneva gear mechanism operatively connected to said table, Geneva gear mechanism operatively connected to said crank shaft and adapted to actuate said shaft alternately to said table, means for causing the rotation of the crank shaft with the table, but to allow its rotation without the table, said means comprising a ratchet fixed to the crank shaft and engaging a yielding pin on the rotatable table, a spring-pressed gear slidably mounted on the crank shaft and a ratchet connection between said gear and the crank shaft to allow the rotation of the crank shaft with the table without affecting the transmission mechanism of the crank shaft.

39. In a machine for building electrical condenser stack the combination with a mechanism for placing condenser sheets in a stack, of an electric motor having circuits and actuating said mechanism, counter-mechanism associated with said mechanism, actuated by said motor and comprising a pair of relatively movable contacts controlling the circuit of said motor to stop the machine, resetting mechanism for positioning said contacts to again operate the machine, and means associated with the said resetting means whereby the contacts may be so positioned as to stop the machine at a different predetermined number of sheet placing operations on the condenser stack.

40. In a machine of the character described, a mechanism, an electric motor having circuits and actuating said mechanism, counter-mechanism associated with said machine and actuated by said motor, said counter-mechanism comprising a plurality of intermittently operated counter wheels, contacts rotatable with said wheels and adapted to engage after a predetermined number of operations to control the motor circuit, a resetting mechanism for resetting the counter-mechanism in position to start the machine, said resetting mechanism comprising a pair of racks movably mounted and a pair of gears having a pawl and ratchet connection with said rotatable contacts and engageable by said racks for separating the contacts and allowing the return of the racks without affecting this setting.

41. In a machine of the character described, a mechanism, an electric motor actuating said mechanism and having circuits, counter-mechanism operated by said motor and comprising a pair of relatively rotatable contacts adapted to engage to stop the machine after a predetermined number of operations, and resetting mechanism for resetting said counter-mechanism and comprising a pair of racks on a unitary mounting and a pair of gears engageable with said racks and having a pawl and ratchet connection with said rotatable contacts whereby, upon the actuation of the racks, said contacts are separated to again start the machine and to allow the return of the racks to inoperative position, said racks being individually adjustable relative to each other and to their gears whereby the amount of actuation of the respective gears may be varied to set the machine for a different predetermined number of operations for stopping.

42. In a machine of the character described, a mechanism, an electric motor having circuits and actuating said mechanism, a counter-mechanism actuated by said motor and comprising a pair of relatively movable contacts adapted to engage after a predetermined number of operations to stop the machine by controlling the motor circuit, resetting means for said counter-mechanism for resetting said contacts to again open the circuit, and means for maintaining the machine in inoperative position until the resetting means has returned to inoperative position.

43. In a machine of the character described, a mechanism, an electric motor actuating said mechanism and having circuits, counter-mechanism associated with said machine, actuated by said motor and comprising a pair of relatively movable contacts adapted to stop the machine after a predetermined number of operations by controlling the motor circuit, resetting mechanism for resetting the counter-mechanism and positioning the said contacts to again start the machine, and a pair of contacts in the motor circuits controlled by said resetting means and to make the machine inoperative until the resetting means has returned to inoperative position.

44. In a machine of the character described, a mechanism, a motor controlling said mechanism and having electrical circuits, counter-mechanism associated with said motor, actuated thereby and comprising a pair of relatively movable contacts in the motor circuit controlling the motor to stop the machine after a predetermined number of operations, and resetting mechanism for said counter-mechanism comprising a pair of slidable racks and a pair of gears having a pawl and ratchet connection with said rotatable contacts, a pivoted lever connected to said racks for actuating the same, a spring tending to maintain said racks and lever in inoperative position, an actuating handle for actuating said lever and racks, means associated with the said handle to ensure a complete operation of the resetting means, and a pair of contacts in the path of movement of said resetting means and opened by the resetting operation and closed when the resetting mechanism returns to inoperative position for starting the machine.

45. In a machine of the character described, a mechanism including a pair of relatively movable dies, means for feeding foil strip through said dies, said foil strip constituting an energized circuit, a motor for actuating said mechanism and having electrical circuits, counter-mechanism operatively connected to said motor, actuated thereby and comprising a pair of relatively movable contacts in the circuit of said motor and adapted to stop the motor after a predetermined number of operations, and means for controlling the motor circuit to stop the machine should said foil circuit be broken by the breaking of the foil.

46. In a machine of the character described, a mechanism, a motor for actuating said mechanism and comprising circuits including an armature, field and electrical brake across the terminals of said armature, electromagnetic switch for alternately throwing said armature and brake in and out, an electromagnetic lock, said electromagnetic switch and lock being in series with each other, counter-mechanism associated with said machine and comprising a pair of relatively movable contacts adapted to close after a predetermined number of operations to control said electromagnetic switch and lock thereby stopping the machine by cutting out the motor armature and throwing in the brake and lock, a resetting mechanism for resetting said contacts to separate the same, and a pair of movable contacts in circuit with said electromagnetic switch and lock and adapted to open upon the actuation of the resetting means and to close and start the machine when the resetting means returns to inoperative position.

47. In a machine of the character described, a mechanism, a motor having electrical circuits and actuating said mechanism, an electrical brake associated with said motor, electromagnetic switch for controlling said motor and brake, an electromagnetic lock in the circuit of said electromagnetic switch, counter-mechanism actuated with said motor and comprising a pair of relatively movable contacts adapted to close after a predetermined number of operations to short-circuit said electromagnetic switch and lock, means for resetting said counter-mechanism and positioning said contacts to open the circuit, and a pair of contacts in series with said switch and lock and controlled by said resetting means.

48. In a machine of the character described, a mechanism including a pair of relatively movable dies, mechanism for feeding foil strip between said dies, said foil strip comprising an energized circuit, an electric motor for actuating said mechanism and having circuits, an electric brake for retarding the movement of said motor, an electromagnetic switch for controlling the circuit of said motor and said brake alternately, an electromagnetic lock for locking the machine against movement, counter-mechanism associated with said first mechanism and comprising a pair of relatively movable contacts adapted to engage after a predetermined number of operations to short-circuit said switch and lock to stop the motor and lock the machine against movement, means controlled by the breaking of said foil strip circuit through the breaking of the foil for short-circuiting said switch and lock to stop the machine, resetting means for said relatively movable contacts for opening the same whereby the machine can start, and a pair of movable contacts in series with said switch and lock and adapted to close to start the machine when the resetting means returns to inoperative position.

49. In a machine of the character described, a magazine adapted to hold a stack of superimposed sheets and comprising a semi-base upon which a portion of the bottom of the stack rests, leaving the remaining portion exposed at the bottom, a forward abutment at one side of the stack, a frictional roller mounted with its upper end substantially on a line with the upper surface of the semi-base, and means movable up and down to pull down a sheet to position to be removed and actuating said roller to move the lower sheet against said abutment to aline the same.

50. In a machine of the character described, a magazine adapted to contain a stack of sheets and comprising a semi-base upon which a part of the lower end of the stack rests, leaving the remaining portion of the stack exposed, a vertically arranged abutment at one side of the stack against which adjacent edges of the sheets are adapted to engage, a frictional roller arranged transversely at the bottom of the stack with its upper portion substantially in line with the upper surface of said semi-base, a vertically movable vacuum cup adapted to suctionally engage a lower sheet to draw the same down, and an interconnection between said cup and said roller whereby the cup when it moves upwardly rotates the roller to cause the lowermost sheet to engage said abutment.

51. In a machine of the character described, a magazine adapted to contain a stack of superimposed sheets, a semi-base upon which a portion of the bottom of the stack rests, leaving the remaining portion exposed at the bottom, a vertically arranged transversely extending abutment adapted to engage the edges of the sheets at one side, a frictional roller pivoted to a suitable frame and arranged beneath the stack and with its upper edge substantially on a line with the upper surface of the semi-base, a vacuum cup mounted below said stack and adapted to be raised and lowered to draw down a sheet suctionally around said roller as an axis to a position whereby it may be removed, and a pawl and ratchet actuating connection between said cup and said roller whereby upon the movement of the cup upwardly to sheet-engaging position the roller is actuated to move the sheet against said vertically arranged abutment to aline the same, the roller remaining stationary during the downward movement of said vacuum cup.

52. In the art of building electrical condenser stacks of metal foil and mica sheets, the method of handling the mica sheets which consists in suctionally engaging a mica at the bottom of a supply stack of flexible mica sheets, bending said mica around a semi-base while so suctionally engaged whereby it is positioned to be removed and then gripping and removing said mica from the supply stack and placing it on the condenser stack.

53. The method of applying fluid insulating material to dielectric sheets which consists in placing the sheet between a pair of fluid-applying jaws while the jaws are open, closing the jaws on the sheet and then drawing out the sheet from between the jaws when closed, thereby forming a bead of insulating fluid upon the edge of the sheet which is last to leave the jaws.

54. The method of building an electrical condenser comprising a stack of one or more dielectric sheets and metal foil face to face therewith, which consists in placing the foil against a dielectric sheet and flattening the foil in place on the dielectric sheet by applying a gas under pressure to said foil.

55. A machine for building mica sheet condenser stacks comprising a mica sheet pickup mechanism, foil sheet punching mechanism, means for conveying the picked up mica sheets to a position adjacent the punching mechanism, and means for stacking the punched foils with the conveyed mica sheets.

56. A machine for building mica sheet condenser stacks comprising three devices, i. e., a mica magazine, mica sheet insulating means, a means for building the insulated mica sheets in a stack all three in combination with and a rotatable table; said three devices being arranged successively and circumferentially around the rotatable table; means carried by the table for conveying the mica sheets from the magazine successively to the insulating means and the stack-building means; and mechanism above the building means for supplying foil sheets to the stack alternately with the mica sheets; said mechanism being arranged to cause simultaneous movement of mica sheets from magazine to insulating means, and from insulating means to building means, and the application of the foil sheets to the stack.

57. A machine for building a mica condenser stack comprising a mica magazine stack; a vacuum device for separating a sheet from the bottom of said magazine in position to be gripped, a gripping device for such sheet; a stack-building stand; mechanism for moving said gripped sheet to said stand and placing it in position in the condenser stack; mechanism for feeding a metal foil strip above the condenser stack; dies for punching a foil sheet from said strip above the stack; and means forcing a fluid against said foil sheet to lay it flat on the stack.

58. A machine for building mica sheet condenser stacks comprising a magazine for holding mica sheets; mechanism for moving the sheets from the magazine comprising a movable table, arms slidably mounted on said table and also movable therewith, said arms being arranged to move from the table to sheet-pickup position at said magazine and toward the table and away from the magazine; mechanism for acting on said sheets after such removal from the magazine; and means for alternately moving said arms and said table with the arms, whereby the arms pick up a sheet to be treated and are moved to the mechanism for acting on the sheets.

59. A machine for building mica sheet condenser stacks comprising a mica magazine and a stack-building stand, a movable table, mechanism carried by the movable table, and itself movable, to convey mica sheets from the magazine to the building stand and stack them thereon; mechanism for feeding a strip of metal foil above the mica sheets in the stack and laying the foil on the stack; and mechanism for causing coordinating operation of the mica-placing and foil-laying means.

60. A machine for building mica sheet condenser stacks comprising a mica magazine and a turnable stack-building stand, a movable table, mechanism carried by the table, and itself movable, to convey mica sheets from the magazine to the building stand and stack them thereon; mechanism for feeding a strip of metal foil above the stack and laying the foil on the stack; mechanism for causing coordinating operation of the mica-placing and foil-laying means; and means for turning the building stand one hundred and eighty degrees (180°) after a foil-laying operation.

61. A machine for building mica sheet condenser stacks comprising a mica magazine and a turnable stack-building stand, a movable table; mechanism carried by the table, and itself movable, to convey mica sheets from the magazine to the building stand and stack them thereon; mechanism for feeding a strip of metal foil above the stack and laying the foil on the stack; mechanism for causing alternate operation of the mica-placing and foil-laying means; means for turning the building stand one hundred and eighty degrees (180°) after a foil-laying operation; and means for maintaining the top of the growing stack at a substantially constant level.

62. The herein-described method of making sheet condenser stacks, which consists in applying fluid insulating material simultaneously to portions of opposite sides of dielectric sheets while forming beads of the fluid insulating material at edges of the sheets, and then building a stack of such dielectric sheets with metal foil sheets, arranging the dielectric sheets so that the beads of fluid thereon are located alternately at different sides of the condenser, thereby distributing the insulating material of the beads over the surfaces of the sheets in the stack.

63. The herein-described method of making a condenser, which consists in placing a mica sheet in position as part of a sheet condenser stack, then punching out from a strip of metal foil a sheet of foil above such condenser stack and lowering said punched foil down in position on said stack; applying a smoothing out fluid to the foil to flatten it on the stack; and continuing alternately such placing of mica and foil sheets on the stack.

64. In the art of building electrical condensers of the type comprising a stack of metal foil and of mica dielectric sheets interleaved with the foil as armatures, the method of handling the micas prior to their combination with the foil in the condenser stack which consists in suctionally engaging a bottom sheet of a stack of flexible mica sheets, flexing said sheet while suctionally engaged, and then mechanically gripping the flexed portion of the sheet and withdrawing it from the supply stack preliminary to conveyance to the condenser stack.

65. In the art of making electrical condensers of the type comprising a stack of mica dielectric sheets and interleaved foil armatures, the method of handling the micas which consists in suctionally gripping the surface of a mica sheet at the end of a stack of flexible mica sheets, removing it from said supply stack, conveying it to the condenser stack and finally placing it on a foil therein.

66. In the art of building electrical condensers of the type comprising a stack of mica dielectric sheets and interleaved foil armatures, the method of handling the mica sheets and laying them on the condenser stack which consists in suctionally engaging the surface of a mica sheet at the end of a supply stack of mica sheets, separating said mica from the supply stack while suctionally engaged, mechanically gripping said mica while so suctionally engaged, moving said mica while so gripped, from the supply stack to the condenser stack, and finally placing said mica, by releasing said mechanical grip, in the condenser stack upon a foil therein.

67. In the art of building electrical condensers of the type comprising a stack of mica dielectric sheets and interleaved foil armatures, the method which consists in suctionally gripping the surface of a mica sheet and conveying it to the condenser stack, laying a foil in said stack, and then placing said conveyed mica on the foil in said stack.

68. In the art of building electrical condensers of the type comprising a stack of mica dielectric sheets and interleaved metal foil armatures, the method which consists in suctionally gripping the surface of a mica sheet, conveying said sheet to the condenser stack; placing a foil in the stack; applying a fluid under pressure to the foil thereby smoothing it flat in the stack; and then placing the conveyed mica on the foil in the stack.

69. A machine for building mica-foil electrical condenser stacks, which comprises a mica magazine, a building stand, a foil-laying mechanism associated with said building stand, mechanism for conveying a mica sheet from said magazine to said building stand; and mechanism for laying the micas on the foil in the building stand.

70. A machine for building mica-foil electrical condenser stacks, which comprises a mica sheet pick-up mechanism, foil-laying mechanism, and mechanism conveying the picked-up micas and placing them on the foil in the condenser stack.

71. A machine for building mica-foil electrical condenser stacks, which comprises a mica sheet magazine, a rotatable table, a stack building stand, mechanism carried by the rotatable table and itself movable, to convey mica sheets from said magazine to said stand and stack them therein, mechanism for feeding metal foil to the stack and laying it therein on the micas, and mechanism co-ordinating the operation of said mica and foil mechanisms.

72. A machine for building mica-foil electrical condenser stacks, which comprises a mica magazine, a stack building stand, and a rotatable table; mica-sheet gripping devices carried by said table and movable relative thereto and conveying the micas from said magazine to said building stand, and mechanism conveying metal foil to and laying it on the micas in the condenser stack in said building stand.

73. A machine for building mica-foil electrical condenser stacks, which comprises a stack building stand, a rotatable table, a plurality of mica-operating mechanisms spaced apart around said table, mica-sheet gripping devices mounted on said table and movable relative thereto and into co-operative relations with said spaced-apart operating mechanisms and said stack building stand, to place the micas in the condenser stack in said stand, and mechanism for laying metal foil on the micas in the stack in the building stand.

74. A machine for building mica-foil electrical condenser stacks, which comprises a mica-sheet magazine, a stack building stand, a vacuum cup separating individual mica sheets from a stack thereof in said magazine, mechanism for placing said micas in the condenser stack in the building stand, and mechanism for laying metal foil on the micas in the condenser stack in the building stand.

75. A machine for building mica-foil electrical condenser stacks, which comprises a mica magazine, a stack building stand, mechanism for laying metal foil in a condenser stack in said stand, mechanism for removing mica sheets from said magazine and conveying them to and placing them in the condenser stack in said stand, and mechanism for applying insulating material to said micas on their way to the building stand, said mechanism including a pair of relatively movable jaws, means for inserting a mica sheet between said jaws when they are open, and means for drawing such sheet from between said jaws when they are closed on the sheet.

76. A machine for building mica-foil electrical condenser stacks, which comprises a building stand, mechanism for conveying mica sheets to and placing them in a condenser stack in the building stand; and mechanism for laying metal foil on the micas in said stack, said mechanism comprising means for feeding the foil to a position face to face with the end of the stack, and means for applying a fluid to the face of the foil forcing it away from its feeding means and against the end of the stack.

77. A machine for building mica-foil electrical condenser stacks, which comprises a stack building stand, mechanism conveying mica sheets to a position above said stand and dropping them upon a condenser stack therein; mechanism conveying metal foil to a position above the stack in the building stand and laying it on the micas in said stack; and mechanism co-ordinating the operation of said mica and foil mechanisms.

78. A machine for building mica-foil electrical condenser stacks, which comprises a stack building stand, mechanism conveying metal foil to a position above said stand and laying it in a stack therein, and mechanism conveying mica sheets to and placing them on the foil in said stack, said foil-laying mechanism and building stand being relatively movable into desired alinement for the stack building operation.

79. A machine for building mica-foil electrical condenser stacks, which comprises a mica sheet magazine, a stack building stand, and mechanism for laying metal foil in a condenser stack in said stand; and mechanism conveying mica sheets from said magazine to said stand, said mechanism comprising a rotatable table, mica pick-up devices mounted on said table, and driving mechanism imparting intermittent movement to said table and pick-up devices alternately.

80. A machine for building mica-foil electrical condenser stacks, which comprises a building stand, mechanism supplying mica sheets and metal foil to and placing them in a condenser stack in said building stand, said mechanism including an intermittently rotating table and parts mounted thereon and operated by the rotation of the table; and mechanism operating said parts while the table is stationary.

81. A machine for building mica-foil electrical condenser stacks, which comprises a stack building stand, mechanism conveying mica sheets to said stand and placing them in a condenser stack therein, mechanism conveying metal foil to said stand and laying it on the micas in the stack therein; and means for stopping the operation of the machine, said means being controlled by the laying of a pre-determined number of condenser sheets in the stack in the building stand.

82. A machine for building mica-foil electrical condenser stacks, which comprises a stack building stand, mechanism conveying metal foil to said stand and laying it on micas in a condenser stack therein; and means controlling the operation of the machine, said means including an electrical control circuit in which said metal foil is connected, whereby a breakage of the foil opens said circuit and stops the operation of the machine.

83. A machine for building mica-foil electrical condenser stacks, which comprises a stack building stand, mechanism conveying metal foil to said stand and laying it on mica sheets in a condenser stack therein; means for driving the machine; a brake on the operation of the machine; mechanism locking the machine in its inoperative condition; and means controlling the operation of said driving means, brake, and locking mechanism and including an electrical controlled circuit in which said metal foil is connected, whereby a breakage of the foil opens said circuit, stops the driving of the machine and causes the operation of said brake and locking mechanism.

84. A machine for building mica-foil electrical condenser stacks, which comprises a stack building stand, mechanism supplying mica sheets and metal foil to said stand and interleaving them in a condenser stack therein; mechanism applying an air blast to the foil as it is placed on the micas in said condenser stack, a source of compressed air mounted independently of the movable foil laying mechanism; and means for supplying compressed air from said independently mounted source to said movable foil laying mechanism.

85. A machine for building mica-foil electrical condenser stacks, which comprises a stack building stand, mechanism for supplying mica sheets and metal foil to and placing them on top of a condenser stack in said stand; and mechanism maintaining the top of said growing stack at a substantially constant level.

86. A machine for building mica-foil electrical condenser stacks, which comprises a stack building stand, mechanism for supplying mica sheets and metal foil to and placing them in a condenser stack in said stand, sheet-counting mechanism, resetting mechanism therefor, and actuating means for said resetting mechanism.

87. A machine for building mica-foil electrical condenser stacks, which comprises a stack building stand in which a condenser stack is to be built by the placing of mica sheets and metal foil on top of one another; in combination with mechanism conveying the foil to a position above said building stand and placing it on the micas in the condenser stack therein.

88. A machine for building mica-foil electrical condenser stacks, which comprises a rotatable building stand, an intermittently rotatable table, mechanism operated by the rotation of the table to supply mica sheets and metal foil to a condenser stack in said building stand, mechanism other than said table for operating said supplying mechanism when the table is at rest, and mechanism rotating said table and building stand intermittently.

89. A machine for building mica-foil electrical condenser stacks, which comprises a building stand in which a condenser stack is to be built by the placing of mica sheets and metal foil on top of one another; in combination with an intermittently rotatable table; mechanism operated by the rotation of the table to supply mica sheets to the stack in said building stand; intermittently operated mechanism feeding a strip of metal foil to said building stand; mechanism simultaneously rotating said table, placing the supplied mica sheets in a condenser stack in said building stand, and operating said foil-feeding mechanism; and mechanism laying the foil in said condenser stack while said table is stationary.

90. A machine for building mica-foil electrical condenser stacks, which comprises a stack building stand; an intermittently rotatable table; mechanism operated by rotation of the table and supplying mica sheets and metal foil to said building stand and placing them alternately in a condenser stack therein; and mechanism for operating said mica and foil mechanism when said table is stationary.

91. A machine for building mica-foil electrical condenser stacks, which comprises a mica sheet magazine, mechanism conveying a strip of metal foil, a stack building stand, a rotatable table, mechanism carried by the table and successively conveying single mica sheets from said magazine to said building stand; and mechanism placing said mica sheets and metal foil alternately in a condenser stack in said building stand.

92. A machine for building mica-foil electrical condenser stacks, which comprises mica pick-up mechanism, mechanism conveying the picked-up micas to and laying them on the foil in a condenser stack; and mechanism conveying the foil to and placing it on the micas in said stack.

WILLIAM H. PRIESS.